(12) United States Patent
Attar et al.

(10) Patent No.: US 8,179,833 B2
(45) Date of Patent: May 15, 2012

(54) HYBRID TDM/OFDM/CDM REVERSE LINK TRANSMISSION

(75) Inventors: Rashid A. Attar, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 821 days.

(21) Appl. No.: 10/984,094

(22) Filed: Nov. 9, 2004

(65) Prior Publication Data
US 2005/0111397 A1    May 26, 2005

Related U.S. Application Data

(63) Continuation-in-part of application No. 10/313,553, filed on Dec. 6, 2002, now Pat. No. 7,139,274.

(60) Provisional application No. 60/518,968, filed on Nov. 10, 2003.

(51) Int. Cl.
*H04B 7/204* (2006.01)
*H04W 4/00* (2009.01)

(52) U.S. Cl. ........................ 370/319; 370/331

(58) Field of Classification Search .............. 455/448, 455/435.2; 370/319, 330, 331, 335, 337, 370/338
See application file for complete search history.

(56) References Cited

U.S. PATENT DOCUMENTS

| | | |
|---|---|---|
| 4,901,307 A | 2/1990 | Gilhousen et al. |
| 5,056,109 A | 10/1991 | Gilhousen et al. |
| 5,103,459 A | 4/1992 | Gilhousen et al. |
| 5,267,261 A | 11/1993 | Blakeney et al. |
| 5,345,439 A | 9/1994 | Marston |
| 5,504,773 A | 4/1996 | Padovani et al. |
| 5,515,379 A | 5/1996 | Crisler et al. |
| 5,594,738 A | 1/1997 | Crisler et al. |
| 5,646,937 A * | 7/1997 | Nakano et al. ............ 370/252 |
| 5,933,462 A | 8/1999 | Viterbi et al. |
| 5,933,787 A | 8/1999 | Gilhousen et al. |
| 6,031,824 A | 2/2000 | Azuma et al. |
| 6,101,168 A | 8/2000 | Chen et al. |
| 6,192,249 B1 | 2/2001 | Padovani |
| 6,205,129 B1 | 3/2001 | Esteves et al. |

(Continued)

FOREIGN PATENT DOCUMENTS

EP          1083698          3/2001

(Continued)

OTHER PUBLICATIONS

Viterbi et al., "Soft Handoff Increases CDMA Coverage and Increases RL Capacity," IEEE Journal on Selected Areas in Communications, vol. 12, No. 8, Oct. 1994, pp. 1281-1288.

(Continued)

*Primary Examiner* — Michael Faragalla
(74) *Attorney, Agent, or Firm* — Charles E. Eggers

(57) ABSTRACT

A communication system includes a plurality of access terminals, and an access network. The access network schedules a transmission of data in a time interval from one of the access terminals. The access network selects a multiple access transmission mode from a plurality of multiple access transmission modes, and broadcasts the selected multiple access transmission mode to the access terminals. The selected mode may include a mode in which data is code-division-multiplexed during the time interval, and modes in which data is code-division-multiplexed during a first portion of the time interval, and data is either time-division-multiplexed or orthogonal-frequency-division-multiplexed during a second portion of the time interval.

67 Claims, 18 Drawing Sheets

U.S. PATENT DOCUMENTS

| | | | |
|---|---|---|---|
| 6,229,795 B1 | 5/2001 | Pankaj et al. | |
| 6,425,105 B1 | 7/2002 | Piirainen et al. | |
| 6,426,971 B1 | 7/2002 | Wu et al. | |
| 6,430,163 B1 | 8/2002 | Mustajarvi | |
| 6,456,605 B1* | 9/2002 | Laakso et al. | 370/330 |
| 6,574,211 B2 | 6/2003 | Padovani et al. | |
| 6,678,257 B1 | 1/2004 | Vijayan et al. | |
| 6,694,469 B1 | 2/2004 | Jalali et al. | |
| 6,801,513 B1 | 10/2004 | Gibbons et al. | |
| 6,807,426 B2 | 10/2004 | Pankaj | |
| 6,810,236 B2 | 10/2004 | Terry et al. | |
| 6,836,666 B2 | 12/2004 | Gopalakrishnan et al. | |
| 6,937,640 B2 | 8/2005 | Yun et al. | |
| 6,996,061 B2 | 2/2006 | Yang et al. | |
| 7,079,584 B2* | 7/2006 | Feher | 375/260 |
| 7,088,734 B2 | 8/2006 | Newberg et al. | |
| 7,116,983 B2 | 10/2006 | Lan et al. | |
| 7,130,638 B2 | 10/2006 | Chen et al. | |
| 7,133,456 B2 | 11/2006 | Feher | |
| 7,283,482 B2 | 10/2007 | Koo | |
| 2001/0053670 A1 | 12/2001 | Voyer | |
| 2002/0085502 A1 | 7/2002 | Chheda et al. | |
| 2002/0105918 A1 | 8/2002 | Yamada et al. | |
| 2004/0141481 A1* | 7/2004 | Lee et al. | 370/335 |
| 2004/0203819 A1 | 10/2004 | Das et al. | |
| 2005/0254465 A1 | 11/2005 | Lundby et al. | |

FOREIGN PATENT DOCUMENTS

| | | |
|---|---|---|
| EP | 1098542 | 5/2001 |
| EP | 1119213 | 7/2001 |
| EP | 1128574 | 8/2001 |
| EP | 1139581 | 10/2001 |
| EP | 1229671 | 8/2002 |
| EP | 1249955 | 10/2002 |
| JP | 10190621 | 7/1998 |
| KR | 2002-0039503 | 5/2002 |
| KR | 2002-0061672 | 7/2002 |
| KR | 2002-0034047 | 8/2002 |
| RU | 2142672 | 12/1999 |
| WO | 0163778 | 8/2001 |
| WO | 0165869 | 9/2001 |
| WO | WO 02/39595 A2 | 5/2002 |
| WO | WO0247408 | 6/2002 |
| WO | 2004019649 | 3/2004 |
| WO | 2004084450 | 9/2004 |

OTHER PUBLICATIONS

3GPP 3G TS 25.211 V3.2.0 (Mar. 2000) "3rd Generation Partnership Project; Technical Specification Group Radio Access Network; Physical channels and mapping of transport channels onto physical channels (RDD) (Release 1999)".

3GPP 3G TS 25.212 V3.2.0 (Mar. 2000) "3rd Generation Partnership Project; Technical Specification Group Radio Access Network; Multiplexing and channel coding (FDD) (Release 1999)".

3GPP 3G TS 25.213 V3.2.0 (Mar. 2000) "3rd Generation Partnership Project; Technical Specification Group Radio Access Network; Spreading and modulation (FDD) (Release 1999)".

3GPP, 3G TS 25.214 V3.2.0 (Mar. 2000) "3rd Generation Partnership Project; Technical Specification Group Radio Access Network; Physical layer procedures (FDD) (Release 1999)".

Attar, R. A., et al., "A Reverse Link Outer-Loop Power Control Algorithm for CDMA2000 1xEV Systems" ICC 2002. 2002 IEEE International Conference on Communications. Conference Proceedings. New York, NY, Apr. 28-May 2, 2002, IEEE International Conference on Communications, New York, NY: IEEE, US vol. 1 of 5 Apr. 28, 2002 pp. 573-578, XP010589559, ISBN: 0-7803-7400-2.

European Search Report—EP03793306—Search Authority—Munich Patent Office—May 29, 2006.

Hsieh, et al. "Towards a Hybrid Network Model for Wireless Packet Data Networks" Computers and Communications, 2002. Proceedings. ISCC 2002. Seventh International Symposium on Jul. 1-4, 2002 Piscataway, NJ, USA, IEEE, Jul. 1, 2002, pp. 264-271, XP010595.

International Search Report—PCT/US03/026369, International Search Authority—European Patent Office—Mar. 12, 2004.

International Search Report—PCT/US04/037405, International Search Authority—European Patent Office—Mar. 23, 2005.

IS-856 "CDMA2000 High Rate Packet Data Air Interface" 3GPP2 C.S0024 Version 2.0, Oct. 27, 2000.

TIA/EIA/IS-95 Mobile Station-Base Station Compatibility Standard for Dual-Mode Wide-Band Spread Spectrum Cellular System.

TIA/EIA/IS-707-A.8, "Data Service Options for Spread Spectrum Systems: Radio Link Protocol Type 2" PN-4145.8 Ballot Resolution Version Mar. 1999.

TR-45.5 Physical Layer Standard for CDMA2000 Spread Spectrum Systems Release C (The IS-2000 Standard) 3GPP2 C.S0002-C Version 1.0, May 28, 2002.

"Written Opinion—PCT/US04/037405, International Search Authority, European Patent Office, Mar. 23, 2005."

Taiwan Search Report—TW093134373- TIPO—Jun. 16, 2011.

* cited by examiner

CDM USER (NO HIGHER MODES SCHEDULED) – MODE 1

1-SLOT = 2048 CHIPS

CDM USER (HIGHER MODES SCHEDULED) – MODE 1

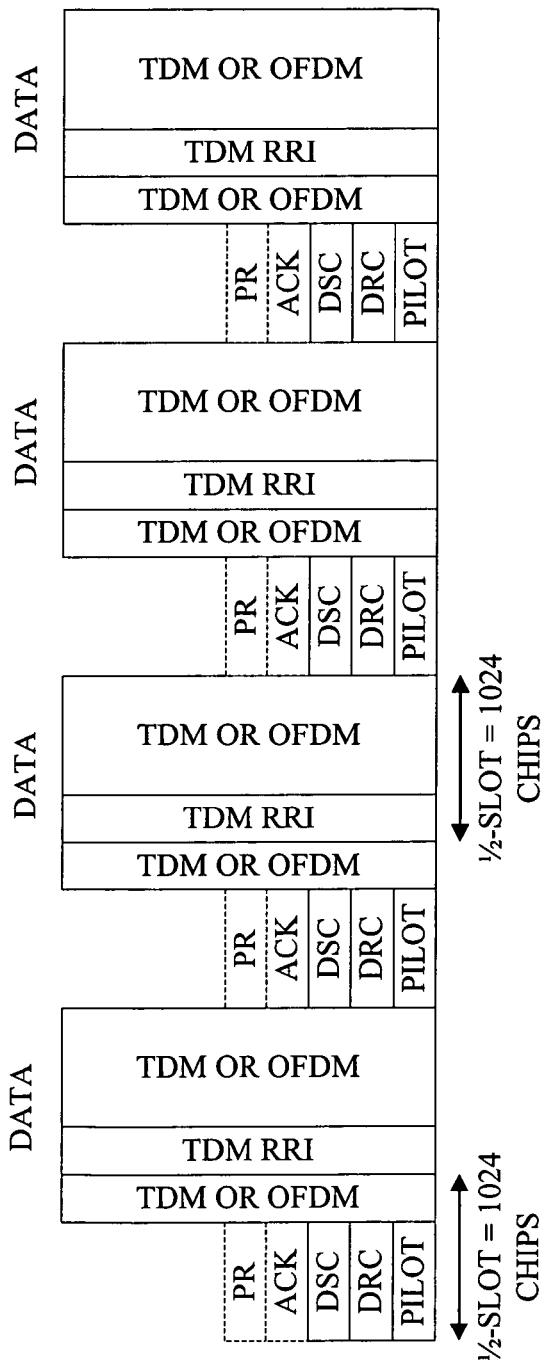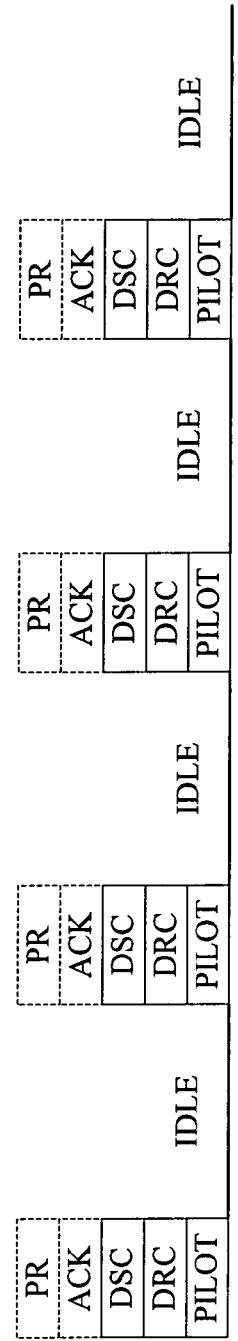
FIG. 13A
FIG. 13B

HYBRID TDM/OFDM/CDM REVERSE LINK TRANSMISSION

CLAIM OF PRIORITY UNDER 35 U.S.C. §119 AND §120

This application is a continuation-in-part application of commonly owned U.S. patent application Ser. No. 10/313,553, entitled "Method and System for a Data Transmission in a Communication System," filed on Dec. 6, 2002. This application claims priority to U.S. Provisional patent application Ser. No. 60/518,968, entitled "Method and System for a Data Transmission in a Communication System," filed on Nov. 10, 2003, and assigned to the assignee hereof and hereby expressly incorporated by reference herein.

BACKGROUND

1. Field

The present invention relates to data transmission in a wireline or a wireless communication system.

2. Background

Wireless communication systems are made up of network elements in communication with mobile devices. The communication link from the network, such as from a Base Station (BS), to a mobile device, such as a Mobile Station (MS), is referred to as the Forward Link (FL). The communication link from the mobile device to the network element is referred to as the Reverse Link (RL). To increase capacity, and therefore revenue, for the carrier, there is a need to optimize resources for the FL and RL.

BRIEF DESCRIPTION OF THE DRAWINGS

FIGS. 13A and 13B illustrate a RL waveform over a subframe in a hybrid transmission mode that is a TDM wherein CDM and TDM/OFDM modes are time divisional multiplexed within a time slot, with a ratio of 1:3 ("mode 3").

DETAILED DESCRIPTION

Figure 1:
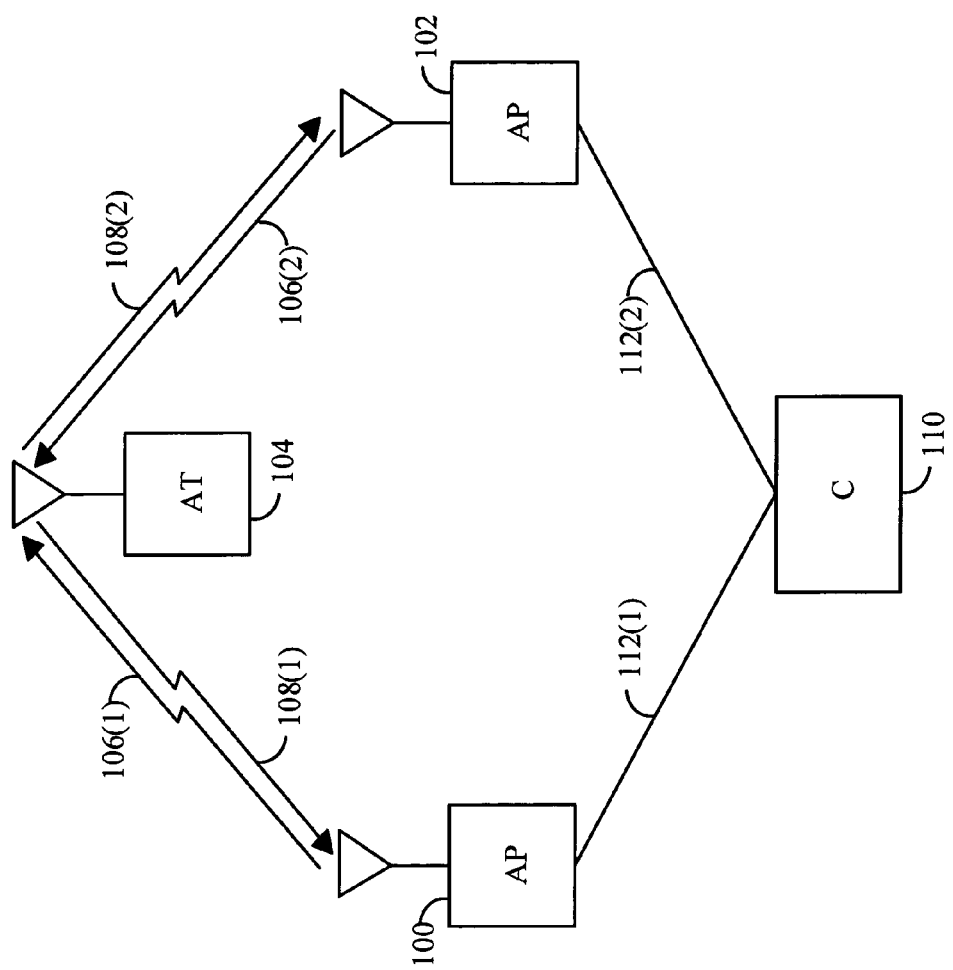
FIG. 1 illustrates conceptual block diagram of a communication system capable of providing data transmission over reverse or FLs.

Communication systems have been developed to allow transmission of information signals from an origination station to a physically distinct destination station. In transmitting an information signal from the origination station over a communication channel, the information signal is first converted into a form suitable for efficient transmission over the communication channel. Conversion, or modulation, of the information signal involves varying a parameter of a carrier wave in accordance with the information signal in such a way that the spectrum of the resulting modulated carrier wave is confined within the communication channel bandwidth. At the destination station, the original information signal is reconstructed from the modulated carrier wave received over the communication channel. In general, such a reconstruction is achieved by using an inverse of the modulation process employed by the origination station. There is further a need to add flexibility to a system to support multiple modulation techniques. There is a need for improved performance in a communication system.

Modulation also facilitates multiple-access, i.e., simultaneous transmission and/or reception, of several signals over a common communication channel. Multiple-access communication systems often include a plurality of remote subscriber units requiring intermittent access of relatively short duration rather than continuous access to the common communication channel. Several multiple-access techniques are known in the art, such as Time Division Multiple Access (TDMA), and frequency division multiple-access (FDMA). Another type of a multiple-access technique is a Code Division Multiple Access (CDMA) spread spectrum system that conforms to the "TIA/EIA/IS-95 Mobile Station-Base Station Compatibility Standard for Dual-Mode Wide-Band Spread Spectrum Cellular System," hereinafter referred to as the IS-95 standard. The use of CDMA techniques in a multiple-access communication system is disclosed in U.S. Pat. No. 4,901,307, entitled "SPREAD SPECTRUM MULTIPLE-ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the present assignee.

A multiple-access communication system may be wireless or wire-line and may carry voice traffic and/or data traffic. An example of a communication system carrying both voice and data traffic is a system in accordance with the IS-95 standard, which specifies transmitting voice and data traffic over a communication channel. A method for transmitting data in code channel frames of fixed size is described in detail in U.S. Pat. No. 5,504,773, entitled "METHOD AND APPARATUS FOR THE FORMATTING OF DATA FOR TRANSMISSION," assigned to the present assignee. In accordance with the IS-95 standard, the data traffic or voice traffic is partitioned into code channel frames that are 20 milliseconds wide with data rates as high as 14.4 Kbps. Additional examples of communication systems carrying both voice and data traffic comprise communication systems conforming to the "3rd Generation Partnership Project" (3GPP), embodied in a set of documents including Document Nos. 3G TS 25.211, 3G TS 25.212, 3G TS 25.213, and 3G TS 25.214 (the W-CDMA standard), or "TR45.5 Physical Layer Standard for cdma2000 Spread Spectrum Systems" (the IS-2000 standard).

The term base station is an access network entity, with which subscriber stations communicate. With reference to the IS-856 standard, the base station is also referred to as an access point. Cell refers to the base station or a geographic coverage area served by a base station, depending on the context in which the term is used. A sector is a partition of a base station, serving a partition of a geographic area served by the base station.

The term "subscriber station" is used herein to mean the entity with which an access network communicates. With reference to the IS-856 standard, the subscriber station is also referred to as an access terminal. A subscriber station may be mobile or stationary. A subscriber station may be any data device that communicates through a wireless channel or through a wired channel, for example fiber optic or coaxial cables. A subscriber station may further be any of a number of types of devices including but not limited to PC card, compact flash, external or internal modem, or wireless or wireline phone. A subscriber station that is in the process of establishing an active traffic channel connection with a base station is said to be in a connection setup state. A subscriber station that has established an active traffic channel connection with a base station is called an active subscriber station, and is said to be in a traffic state.

The term access network is a collection of at least one base station (BS) and one or more base stations' controllers. The access network transports information signals between multiple subscriber stations. The access network may be further connected to additional networks outside the access network, such as a corporate intranet or the Internet, and may transport information signals between each base station and such outside networks.

In the above-described multiple-access wireless communication system, communications between users are conducted through one or more base stations. The term user refers to both animate and inanimate entities. A first user on one wireless subscriber station communicates to a second user on a second wireless subscriber station by conveying information signals on an RL to a base station. The base station receives the information signal and conveys the information signal on a FL to the second subscriber station. If the second subscriber station is not in the area served by the base station, the base station routes the data to another base station, in whose service area the second subscriber station is located. The second base station then conveys the information signal on a FL to the second subscriber station. As discussed hereinabove, the FL refers to transmissions from a base station to a wireless subscriber station and the RL refers to transmissions from a wireless subscriber station to a base station. Likewise, the communication can be conducted between a first user on a wireless subscriber station and a second user on a landline station. A base station receives the data from the first user on the wireless subscriber station on a RL, and routes the data through a Public Switched Telephone Network (PSTN) to the second user on a landline station. In many communication systems, e.g., IS-95, W-CDMA, and IS-2000, the FL and the RL are allocated separate frequencies.

Study of voice only services and data traffic only services revealed some substantial differences between the two types of services. One difference concerns delay in delivery of the information content. The voice traffic services impose stringent and fixed delay requirements. Typically, an overall one-way delay of a predetermined amount of voice traffic information, referred to as a speech frame, must be less than 100 ms. In contrast, the overall one-way data traffic delay may be a variable parameter, used to optimize the efficiency of the data traffic services provided by the communication system. For example, multi-user diversity, delay of data transmission until more favorable conditions, more efficient error correcting coding techniques, which require significantly larger delays than delays that can be tolerated by voice traffic services, and other techniques may be utilized. An example of efficient coding scheme for data is disclosed in U.S. patent application Ser. No. 08/743,688, entitled "SOFT DECISION OUTPUT DECODER FOR DECODING CONVOLUTIONALLY ENCODED CODEWORDS," filed Nov. 6, 1996, now U.S. Pat. No. 5,933,462, issued Aug. 3, 1999, assigned to the present assignee.

Another significant difference between voice traffic services and data traffic services is that the former require a fixed and common Grade of Service (GOS) for all users. Typically, for digital communication systems providing voice traffic services, this requirement translates into a fixed and equal transmission rate for all users and a maximum tolerable value for the error rates of speech frames. In contrast, the GOS for data services may be different from user to user, and may be a variable parameter, whose optimization increases the overall efficiency of the data traffic service providing communication system. The GOS of a data traffic service providing communication system is typically defined as the total delay incurred in the transfer of a predetermined amount of data traffic information, which may comprise, e.g., a data packet. The term packet is a group of bits, including data (payload) and control elements, arranged into a specific format. The control elements comprise, e.g., a preamble, a quality metric, and others known to one skilled in the art. The quality metric comprises, e.g., a Cyclic Redundancy Check (CRC), a parity bit, and others known to one skilled in the art.

Yet another significant difference between voice traffic services and data traffic services is that the former requires a reliable communication link. When a subscriber station, communicating voice traffic with a first base station, moves to the edge of the cell served by the first base station, the subscriber station enters a region of overlap with another cell served by a second base station. The subscriber station in such a region establishes a voice traffic communication with the second base station while maintaining a voice traffic communication with the first base station. During such a simultaneous communication, the subscriber station receives a signal carrying identical information from two base stations. Likewise, both of the base stations also receive signals carrying information from the subscriber station.

Such a simultaneous communication is termed soft handoff. When the subscriber station eventually leaves the cell served by the first base station, and breaks the voice traffic communication with the first base station, the subscriber station continues the voice traffic communication with the second base station. Because soft handoff is a "make before break" mechanism, the soft-handoff minimizes the probability of dropped calls. A method and system for providing a communication with a subscriber station through more than one base station during the soft handoff process are disclosed in U.S. Pat. No. 5,267,261, entitled "MOBILE ASSISTED SOFT HANDOFF IN A CDMA CELLULAR TELEPHONE SYSTEM," assigned to the present assignee.

Softer handoff is a similar process whereby the communication occurs over at least two sectors of a multi-sector base station. The process of softer handoff is described in detail in U.S. patent application Ser. No. 08/763,498, entitled "METHOD AND APPARATUS FOR PERFORMING HANDOFF BETWEEN SECTORS OF A COMMON BASE STATION," filed Dec. 11, 1996, now U.S. Pat. No. 5,933,787 issued Aug. 3, 1999, assigned to the present assignee. Thus, both soft and softer handoff for voice services result in redundant transmissions from two or more base stations to improve reliability.

This additional reliability is not so important for data traffic communications because the data packets received in error may be retransmitted. Important parameters for data services are transmission delay required to transfer a data packet and the average throughput rate of the data traffic communication system. The transmission delay does not have the same impact in data communication as in voice communication, but the transmission delay is an important metric for measuring the quality of the data communication system. The average throughput rate is a measure of the efficiency of the data transmission capability of the communication system. Because of relaxed transmission delay requirement, the transmit power and resources used to support soft handoff on the FL may be used for transmission of additional data, thus, increasing average throughput rate by increasing efficiency.

The situation is different on the RL. Several base stations may receive the signal transmitted by a subscriber station. Because re-transmission of packets from a subscriber station requires additional power from a power limited source (a battery), it may be efficient to support soft handoff on the RL by allocating resources at several base stations to receive and process the data packets transmitted from the subscriber station. Such a utilization of soft-handoff increases both coverage and RL capacity as discussed in a paper by Andrew J. Viterbi and Klein S. Gilhousen: "Soft Handoff Increases CDMA coverage and Increases RL Capacity," IEEE Journal on Selected Areas in Communications, Vol. 12, No. 8, October 1994. The term soft handoff is a communication between a subscriber station and two or more sectors, wherein each sector belongs to a different cell. In the context of the IS-95 standard, the RL communication is received by both sectors, and the FL communication is simultaneously carried on the two or more sectors' FLs. In the context of the IS-856 standard, data transmission on the FL is non-simultaneously carried out between one of the two or more sectors and the access terminal. Additionally, a softer handoff may be used for this purpose. The term softer handoff is a communication between a subscriber station and two or more sectors, wherein each sector belongs to the same cell. In the context of the IS-95 standard, the RL communication is received by both sectors, and the FL communication is simultaneously carried on one of the two or more sectors' FLs. In the context of the IS-856 standard, data transmission on the FL is non-simultaneously carried out between one of the two or more sectors and the access terminal.

It is well known that quality and effectiveness of data transfer in a wireless communication system is dependent on the condition of a communication channel between a source terminal and a destination terminal. Such a condition, expressed as, for example, a Signal-to-Interference-and-Noise Ratio (SINR), is affected by several factors, e.g., a path loss and the path loss' variation of a subscriber station within a coverage area of a base station, interference from other subscriber stations both from the same cell and from other cell, interference from other base stations, and other factors known to one of ordinary skill in the art. In order to maintain a certain level of service under variable conditions of the communication channel, TDMA and FDMA systems resort to separating users by different frequencies and/or time slots and support frequency reuse to mitigate the interference. Frequency reuse divides an available spectrum into many sets of frequencies. A given cell uses frequencies from only one set; the cells immediately adjacent to this cell may not use a frequency from the same set. In a CDMA system, the identical frequency is reused in every cell of the communication system, thereby improving the overall efficiency. The interference is mitigated by other techniques, e.g., orthogonal coding, transmission power control, variable rate data, and other techniques known to one of ordinary skill in the art.

The above-mentioned concepts were utilized in a development of a data traffic only communication system known as the High Data Rate (HDR) communication system. Such a communication system is disclosed in detail in co-pending application Ser. No. 08/963,386, entitled "METHOD AND APPARATUS FOR HIGH RATE PACKET DATA TRANSMISSION," filed Nov. 3, 1997, now U.S. Pat. No. 6,574,211 issued Jun. 3, 2003, assigned to the present assignee. The HDR communication system was standardized as a TIA/EIA/IS-856 industry standard hereinafter referred to as the IS-856 standard.

The IS-856 standard defines a set of data rates, ranging from 38.4 kbps to 2.4 Mbps, at which an Access Point (AP) may send data to a subscriber station (Access Terminal (AT)). Because the access point is analogous to a base station, the terminology with respect to cells and sectors is the same as with respect to voice systems. In accordance with the IS-856 standard, the data to be transmitted over the FL are partitioned into data packets, with each data packet being transmitted over one or more intervals (time slots), into which the FL is divided. At each time slot, data transmission occurs from an access point to one and only one access terminal, located within the coverage area of the access point, at the maximum data rate that may be supported by the FL and the communication system. The access terminal is selected in accordance with FL conditions between the access point and an access terminal. The FL conditions depend on interference and path loss between an access point and an access terminal, both of which are time-variant. The path loss and the variation of the path loss are exploited by scheduling the access point's transmissions at time intervals, during which the access terminal's FL conditions to a particular access point satisfy determined criteria that allow for transmissions with less power or higher rate of data than transmissions to the remaining access terminals, thus improving spectral efficiency of FL transmissions.

In contrast, according to the IS-856 standard, data transmissions on the RL occur from multiple access terminals located within a coverage area of an access point. Furthermore, because the access terminals' antenna patterns are omni-directional, any access terminal within the coverage area of the access point may receive these data transmissions. Consequently, the RL transmissions are subjected to several sources of interference: code-division multiplexed overhead channels of other access terminals, data transmissions from access terminals located in the coverage area of the access point (same cell access terminals), and data transmissions from access terminals located in the coverage area of other access points (other cell access terminals).

With the development of wireless data services, the emphasis has been on increasing data throughput on the forward link, following the model of Internet services; where a server provides high rate data in response to requests from a host. The server-to-host direction is akin to a forward link requiring a high throughput, while the host-to-server requests and/or data transfers are at lower throughput. However, present developments indicate a growth of reverse link data intense applications, e.g., file transfer protocol (FTP), video conferencing, gaming, constant bit rate services, and the like. Such applications require improved efficiency of the reverse link to achieve higher data rates, so that applications demanding high throughput over reverse link. Therefore, there is a need in the art to increase data throughput on the reverse link, ideally to provide symmetric forward and reverse links throughputs. The increased data throughput on the reverse link further creates need in the art for method and apparatus for a power control and a rate of data determination.

The above and further features of the invention are set forth with particularity in the appended claims and together with advantages thereof will become clearer form considerations of the following detailed description of embodiments of the invention given by way of example with reference to the accompanying drawings.

FIG. 1 illustrates a conceptual diagram of a communication system. Such a communication system may be built in accordance with the IS-856 standard. An Access Point (AP) 100 transmits data to an AT (AT) 104 over a forward link (FL) 106(1), and receives data from the AT 104 over a Reverse Link (RL) 108(1). Similarly, an AP 102 transmits data to the AT 104 over a FL 106(2), and receives data from the AT 104 over a RL 108(2). Data transmission on the FL occurs from one AP to one AT at or near the maximum data rate that can be supported by the FL and the communication system. Additional channels of the FL, e.g. the control channel, may be transmitted from multiple APs to one AT. RL data communication may occur from one AT to one or more APs. The AP 100 and the AP 102 are connected to a controller 110 over backhauls 112(1) and 112(2). A "backhaul" is a communication link between a controller and an AP. Although only two APs and one are shown in FIG. 1, this is for the sake of explanation only, and the communication system can comprise a plurality of ATs and APs.

After registration, which allows an AT to access an access network, the AT 104 and one of the APs, e.g., the AP 100, establish a communication link using a predetermined access procedure. In the connected state, resulting from the predetermined access procedure, the AT 104 is able to receive data and control messages from the AP 100, and is able to transmit data and control messages to the AP 100. The AT 104 continually searches for other APs that could be added to the AT's 104 active set. An active set comprises a list of APs capable of communication with the AT 104. When such an AP is found, the AT 104 calculates a quality metric of the AP's FL, which may comprise a Signal-to-Interference-and-Noise Ratio (SINR). An SINR may be determined in accordance with a pilot signal. The AT 104 searches for other APs and determines APs' SINR. Simultaneously, the AT 104 calculates a quality metric of a FL for each AP in the AT's 104 active set. If the FL quality metric from a particular AP is above a predetermined add threshold or below a predetermined drop threshold for a predetermined period of time, the AT 104 reports this information to the AP 100. Subsequent messages from the AP 100 may direct the AT 104 to add to or to delete from the AT 104 active set the particular AP.

The AT 104 selects a serving AP from the AT's 104 active set based on a set of parameters. A serving AP is an AP that is selected for data communication a particular AT or an AP that is communicating data to the particular AT. The set of parameters may comprise any one or more of present and previous SINR measurements, a bit-error-rate, a packet-error-rate, for example, and any other known parameters. Thus, for example, the serving AP may be selected in accordance with the largest SINR measurement. The AT 104 then broadcasts a data request message (DRC message) on a data request channel (DRC channel). The DRC message may contain a requested data rate or, alternatively, an indication of a quality of the FL, e.g., measured SINR, a bit-error-rate, a packet-error-rate and the like. The AT 104 may direct the broadcast of the DRC message to a specific AP by the use of a code, which uniquely identifies the specific AP. Typically, the code comprises a Walsh code. The DRC message symbols are exclusively OR'ed (XOR) with the unique Walsh code. This XOR operation is referred to as Walsh covering of a signal. Since each AP in the active set of the AT 104 is identified by a unique Walsh code, only the selected AP which performs the identical XOR operation as that performed by the AT 104 with the correct Walsh code may correctly decode the DRC message.

The data to be transmitted to the AT 104 arrive at the controller 110. Thereafter, the controller 110 may send the data to all APs in the AT 104 active set over the backhaul 112. Alternatively, the controller 110 may first determine, which AP was selected by the AT 104 as the serving AP, and then send the data to the serving AP. The data are stored in a queue at the AP(s). A paging message is then sent by one or more APs to the AT 104 on respective control channels. The AT 104 demodulates and decodes the signals on one or more control channels to obtain the paging messages.

At each FL interval, the AP may schedule data transmissions to any of the ATs that received the paging message. An example of method for scheduling transmissions is described in U.S. Pat. No. 6,229,795, entitled "System for allocating resources in a communication system," assigned to the present assignee. The AP uses the rate control information received in the DRC message from each AT to efficiently transmit FL data at the highest possible rate. Because the rate of data may vary, the communication system operates in a variable rate mode. The AP determines the data rate at which to transmit the data to the AT 104 based on the most recent value of the DRC message received from the AT 104. Additionally, the AP uniquely identifies a transmission to the AT 104 by using a spreading code which is unique to that mobile station. This spreading code is a long pseudo-random noise (PN) code, for example a spreading code defined by the IS-856 standard.

The AT 104, for which the data packet is intended, receives and decodes the data packet. Each data packet is associated with an identifier, e.g. a sequence number, which is used by the AT 104 to detect either missed or duplicate transmissions. In such an event, the AT 104 communicates the sequence numbers of the missing data packets via the RL data channel. The controller 110, which receives the data messages from the AT 104 via the AP communicating with the AT 104, then indicates to the AP what data units were not received by the AT 104. The AP then schedules a re-transmission of such data packets.

When the communication link between the AT 104 and the AP 100, operating in the variable rate mode, deteriorates below a predetermined reliability level, the AT 104 first attempts to determine whether another AP in the variable rate mode may support an acceptable rate of data. If the AT 104 ascertains such an AP (e.g., the AP 102), a re-pointing to the AP 102 to a different communication link occurs. The term re-pointing is a selection of a sector that is a member of an ATs' active list, wherein the sector is different than a currently selected sector. The data transmissions continue from the AP 102 in the variable rate mode.

The above-mentioned deterioration of the communication link may be caused by, e.g., the AT 104 moving from a coverage area of the AP 100 to the coverage area of the AP 102, shadowing, fading, and other well known reasons. Alternatively, when a communication link between the AT 104 and another AP (e.g., the AP 102) that may achieve a higher throughput rate than the currently used communication link becomes available, a re-pointing to the AP 102 to a different communication link occurs, and the data transmissions continue from the AP 102 in the variable rate mode. If the AT 104 fails to detect an AP that can operate in the variable rate mode and support an acceptable data rate, the AT 104 transitions into a fixed rate mode. In such a mode, AT transmits at one rate.

The AT 104 evaluates the communication links with all candidate APs for both variable rate data and fixed rate data modes, and selects the AP, which yields the highest throughput.

The AT 104 will switch from the fixed rate mode back to the variable rate mode if the sector is no longer a member of the AT 104 active set.

The above-described fixed rate mode and associated methods for transition to and from the fixed rate data mode are similar to those disclosed in detail in U.S. Pat. No. 6,205,129, entitled "METHOD AND APPARATUS FOR VARIABLE AND FIXED FL RATE CONTROL IN A MOBILE RADIO COMMUNICATION SYSTEM," assigned to the present assignee. Other fixed rate modes and associated methods for transition to and from the fixed mode can also be contemplated and are within the scope of the present invention.

FL Structure

Figure 2:
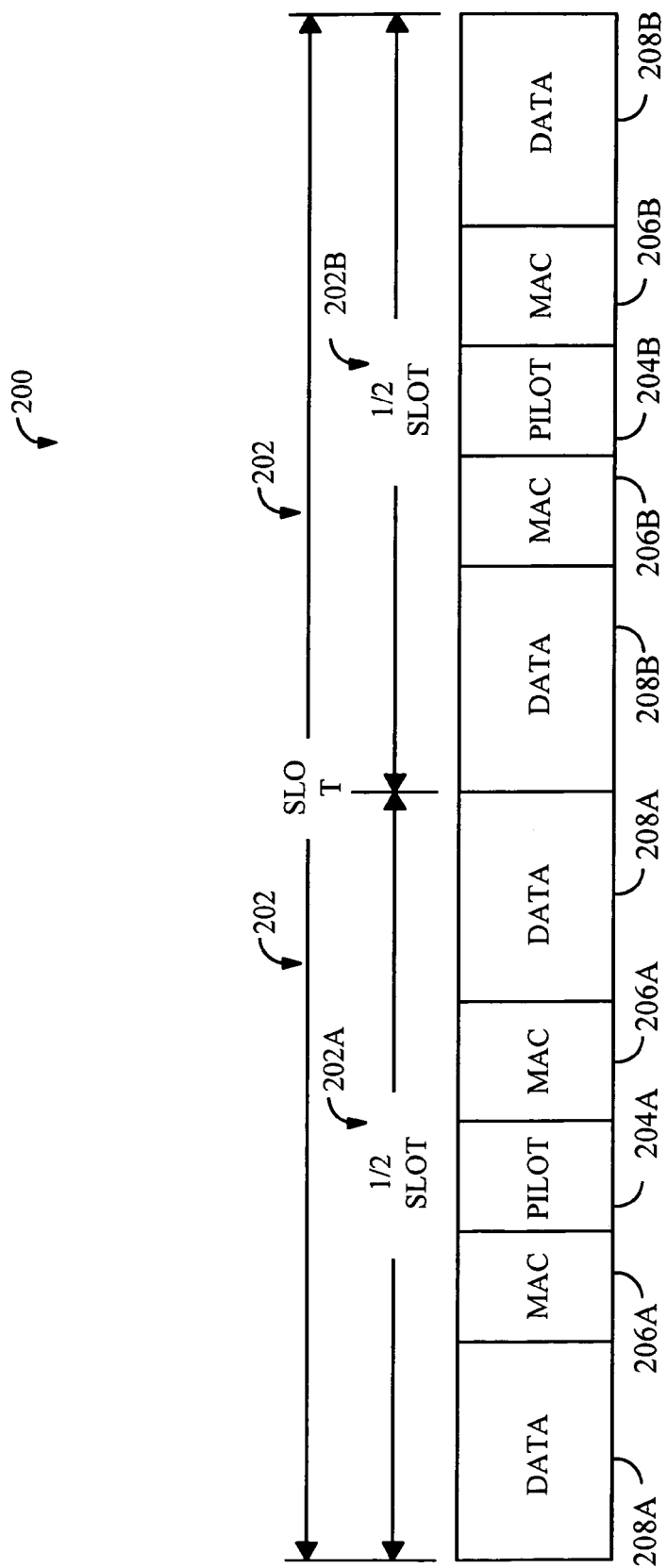
FIG. 2 illustrates a FL waveform.

FIG. 2 illustrates a FL structure 200. It will be appreciated that the below described time durations, chip lengths, value ranges are given in a way of example only, and other time durations, chip lengths, value ranges may be used without departing from the underlying principles of operation of the communication system. The term "chip" is a unit of a Walsh code spreading signal having two possible values.

The FL 200 is defined in terms of frames. A frame is a structure comprising 16 time slots 202, each time slot 202 being 2048 chips long, corresponding to a 1.66 ms time slot duration, and, consequently, a 26.66 ms frame duration. Each time slot 202 is divided into two half-time slots 202A, 202B, with pilot bursts 204a, 204b 204A, 204B transmitted within each half-time slot 202A, 202B. Each pilot burst 204A, 204B is 96 chips long, centered about a mid-point of its associated half-time slot 202A, 202B. The pilot bursts 204A, 204B comprise a pilot channel signal covered by a Walsh cover with index 0. A forward medium access control (MAC) channel 206 forms two bursts, which are transmitted immediately before and immediately after the pilot burst 204 of each half-time slot 202. The MAC is composed of up to 64 code channels, which are orthogonally covered by 64-ary Walsh codes. Each code channel is identified by a MAC index, which has a value between 1 and 64, and identifies a unique 64-ary covering Walsh code. A Reverse Power Control (RPC) channel is used to regulate the power of the RL signals for each subscriber station. The RPC is assigned to one of the available MACs with MAC index between 5 and 63. The FL traffic channel or the control channel payload is sent in the remaining portions 208A of the first half-time slot 202A and the remaining portions 208B of the second half-time slot 202B. The traffic channel carries user data, while the control channel carries control messages, and may also carry user data. The control channel is transmitted with a cycle defined as a 256 slot period at a data rate of 76.8 kbps or 38.4 kbps. The term user data, also referred to as traffic, is information other than overhead data. The term overhead data is information enabling operation of entities in a communication system, e.g., call maintenance signaling, diagnostic and reporting information, and the like.

To support the RL transmission, an additional Packet Grant (PG) channel is needed in the FL. The modulation of the above-mentioned RPC channel is changed from Binary Phase-Shift Keying (BPSK) to a Quadrature-Phase Shift Keying (QPSK), to support PG channel commands.

Figure 3:
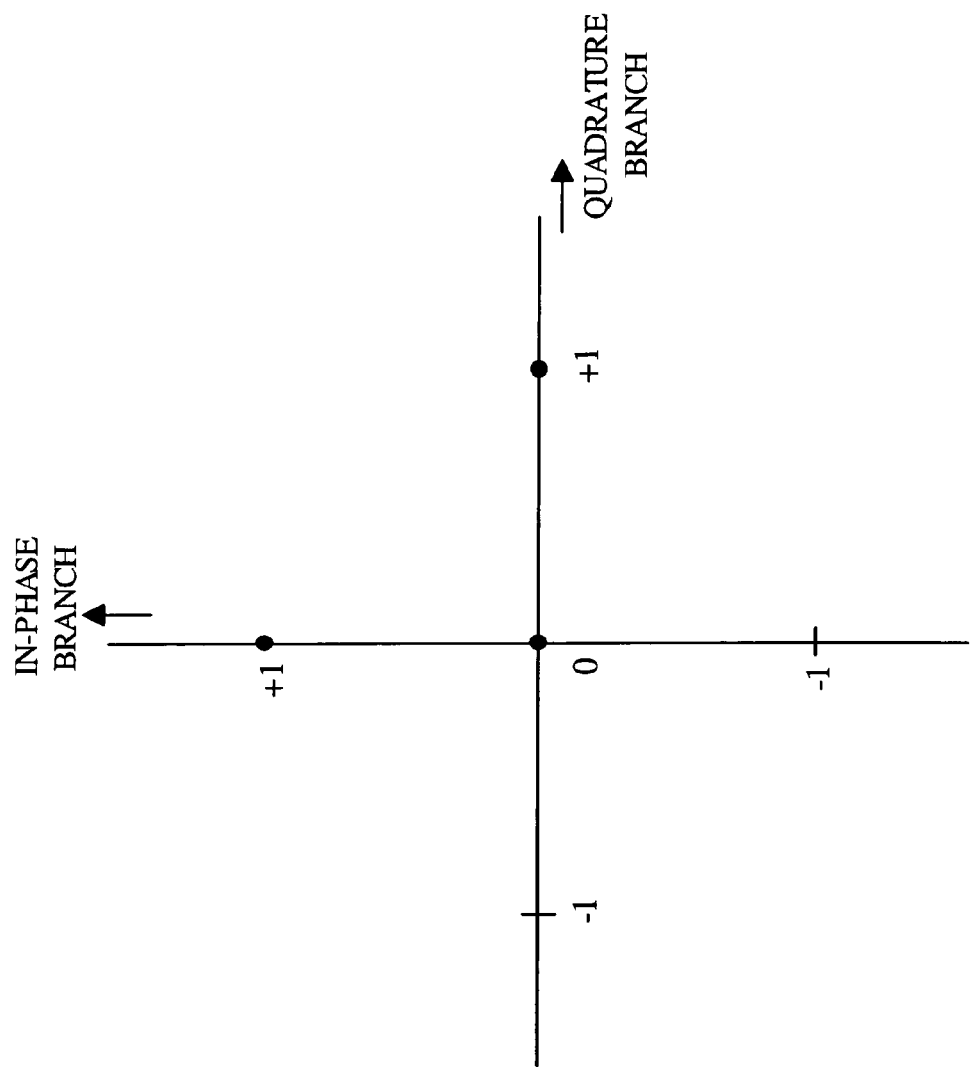
FIG. 3 illustrates a method of communicating power control commands and packet grant commands over a reverse power control channel.

The power control commands are modulated on the in-phase branch of the RPC channel assigned to an AT. The power control command information is binary, wherein a first value of a power control bit ("up") commands the AT to increase the AT's transmit power and a second value of a power control bit ("down") commands the AT to decrease the AT's transmit power. As illustrated in FIG. 3, the "up" command is represented as +1; the "down" command is represented as −1. However, other values may be used.

The PG channel is communicated over a quadrature branch of the RPC channel assigned to the AT. Information transmitted on the PG channel is ternary. As illustrated in FIG. 3, the first value is represented as +1, the second value is represented as 0, and the third value is represented as −1. The information has the following meaning to both the AP and the AT: +1 means that permission to transmit a new packet has been granted; 0 means that permission to transmit a new packet has not been granted; and −1 means that permission to transmit an old packet (re-transmission) has been granted.

The above described signaling, in which transmission of information value 0 requires no signal energy, allows the AP to assign energy to the PG channel only when transmitting an indication to transmit a packet. Because only one or a small number of ATs are granted permission to transmit on the RL in a time interval, the PG channel requires very little power in order to provide RL transmission information. Consequently, impact on the RPC power allocation method is minimized. The RPC power allocation method is disclosed in U.S. patent application Ser. No. 09/669,950, entitled "METHODS AND APPARATUS FOR ALLOCATION OF POWER TO BASE STATION CHANNELS," filed Sep. 25, 2000, now U.S. Pat. No. 6,678,257, issued Jan. 13, 2004, assigned to the present assignee. Furthermore, the AT is required to perform a ternary decision on the quadrature stream only when the AT is expecting a response following a data transmit request, or when the AT has a pending data transmission. However, it will be appreciated that the choice of the ternary values is a design choice, and values, other than the ones described may be used instead.

The AT receives and demodulates the RPC/PG channel from all APs in the AT's active set. Consequently, the AT receives the PG channel information conveyed over the quadrature branch of the RPC/PG channel for every AP in the AT's active set. The AT may filter the energy of the received PG channel information over one update interval, and compare the filtered energy against a set of thresholds. By appropriate choice of the thresholds, the ATs that have not been granted permission for transmission, decode the zero energy assigned to the PG channel as 0 with high probability.

The information conveyed over the PG channel is further used as a means for Automatic Re-transmission request (ARQ). As discussed below, a RL transmission from an AT may be received on several APs. Consequently, the information transmitted in response to the RL transmission over the PG channel is interpreted differently when transmitted by a serving or non-serving AP.

The serving AP generates and transmits permission to transmit a new packet as a response to an AT's request to transmit a new packet if a previous packet from the AT was received correctly. Consequently, such information on the PG channel serves as an Acknowledgement (ACK). The serving AP generates and transmits permission to re-transmit the previous packet as a response to the AT's request to transmit a new packet if the previous packet from the AT was received incorrectly.

The non-serving access point generates and transmits a value indicating a permission to transmit upon correctly receiving a previous packet from the access terminal. Consequently, such information on the PG channel serves as an ACK. The non-serving access point generates and transmits value indicating a permission to re-transmit upon correctly incorrectly receiving previous packet from the access terminal. Consequently, such an information on the PG channel serves as a NACK. Therefore, no separate ACK/NACK channel is necessary.

It is possible that an AT receives conflicting information on the PG channel, e.g., because some APs failed to correctly receive the AT's transmission, because the information on the PG channel was erased or incorrectly received, or for other known reasons. Because, from the access network perspective, it does not matter, which AP received the AT's transmission, when the AT receives information on the PG channel interpreted as an ACK from any APs, it transmits a new packet at the next transmission grant, although the serving AP may send a permission to re-transmit an old packet.

It will be appreciated that the present teaching is applicable to different FL structures. Thus, for example, the above-described FL channels may be transmitted not sequentially but simultaneously. Additionally, any FL, enabling communication of information provided in the PG channel, e.g., a separate PG and ACK/NACK code channels, may be used instead.

RL

As discussed above, quality and effectiveness of a data transfer is dependent on conditions of the channel between a source terminal and a destination terminal. Channel conditions depend on interference and path loss, both of which are time-variant. Therefore, the RL performance may be improved by methods to mitigate interference. On the RL, all ATs in an access network may simultaneously transmit on the same frequency (one frequency reuse set) or multiple ATs in the access network may simultaneously transmit on the same frequency (frequency reuse set greater than one). It is noted that the RL as described herein may utilize any frequency reuse. Therefore, any AT's RL transmission is subject to several sources of interference. The most dominant sources of interference are: transmission of code division multiplexed overhead channels from other ATs both from the same cell and from other cells; transmission of user data by ATs in the same cell; and transmission of user data by ATs from other cells.

Studies of RL performance in the Code Division Multiple Access (CDMA) communication systems indicate that eliminating same cell interference may achieve a significant improvement in the quality and effectiveness of the data transfer. Same cell interference in the communication system in accordance with the IS-856 standard may be mitigated by limiting the number of ATs that may simultaneously transmit on the RL.

Because two modes of operation, i.e., limiting the number of simultaneously transmitting ATs and allowing all ATs to transmit simultaneously exists, the access network needs to indicate to the ATs, which mode is to be used. The indication is communicated to the ATs in periodic intervals, i.e., in a pre-determined portion of a FL channel, e.g., every control channel cycle. Alternatively, the indication is communicated to the ATs only upon change by a broadcast message in a FL channel, e.g., a reverse power control channel.

When operating in the limiting mode, the above-described packed packet grant forward link channel may be utilized to provide permission or denial to transmit to the access terminals requesting permission to transmit.

The same cell interference may also be mitigated by time division multiplexing traffic channel and overhead channels of the RL, and by scheduling, which of the ATs requesting transmission are allowed to transmit in the RL time interval, e.g., a frame, or a time slot. The scheduling may take into account a part of the access network, e.g., a multi-sector cell and may be carried out e.g., by an AP controller. Such a scheduling method mitigates only same cell interference. Consequently, as an alternative, the scheduling may take into account the entire access network, and may be carried out, e.g., by the controller 110.

It will be appreciated that the number of ATs permitted to transmit in a time interval influences the interference on the RL, and, consequently the Quality of Service (QoS) on the RL. Therefore, the number of ATs permitted to transmit is a design criterion. Consequently, such a number may be adjusted by the scheduling method in accordance with changing conditions and/or requirements on QoS.

Additional improvements may be achieved by mitigating other cell interference. The other cell interference during user data transmissions is mitigated by opportunistic transmission, control of maximum transmit power and rate of user data for each AT within a multi-sector cell. An "opportunistic transmission" (and multi-user diversity) mean scheduling an AT's transmissions in time interval(s) in which a determined opportunity threshold is exceeded. A time interval may be deemed to be opportune if a metric, determined in accordance with an instantaneous quality metric of the RL channel in the time interval, an average quality metric of that RL channel, and a function enabling differentiation between users (such as an impatience function described below), exceeds an opportunity threshold. The method enables the AT to transmit user data at a lower transmit power and/or to complete the transmission of a packet using fewer time intervals. The lower transmit power and/or completion of a packet transmission in fewer time intervals results in reduced interference from the transmitting ATs in sectors of the multi-sector cell, and, therefore, in lower overall other cell interference to ATs in adjacent cells. Alternatively, the better than average channel condition allows the terminal to utilize the available power to transmit at a higher data rate, thus, causing the same interference to other cells as the AT would cause by utilizing the same available power to transmit at a lower data rate.

In addition to mitigating interference on the RL channels, the path loss and the variation of the path loss may be exploited by multi-user diversity to increase throughput. "Multi-user diversity" results from the diversity of channel conditions among the ATs. The diversity in channel conditions among user terminals allows scheduling an AT's transmissions at time intervals, during which the AT's channel conditions satisfy determined criteria that allow for transmissions with less power or higher rate of data, thus improving spectral efficiency of RL transmissions. Such criteria comprises the quality metric of an AT's RL channel being better in relation to the average quality metric of the AT's RL channel.

A design of a scheduler may be used to control ATs QoS. Thus, for example, by biasing the scheduler towards a subset of the ATs, the subset may be given transmission priority, although the opportunity reported by these terminals may be lower than the opportunity reported by terminals not belonging to the subset. It will be appreciated that a similar effect may be achieved by employing an impatience function discussed below. The term subset is a set whose members comprise at least one member, but up to all members, of another set.

Even employing an opportunistic transmission method, the transmitted packet may be received erroneously and/or erased at an AP. The term erasure is failure to determine a content of the message with a required reliability. This erroneous reception stems from the inability of an AT to accurately predict the quality metric of the AT's RL channel due to the other cell interference influence. The influence of the other cell interference is difficult to quantify because the transmissions of ATs from sectors belonging to different multi-sector cells are unsynchronized, short, and uncorrelated.

To mitigate the incorrect channel estimation and provide interference averaging, Automatic Re-transmission reQuest (ARQ) methods are often used. ARQ methods detect missing or erroneously received packet(s) at a physical layer or a link layer and request re-transmission of these packets from the transmitting terminal. Layering is a method for organizing communication protocols in well-defined encapsulated data units between otherwise de-coupled processing entities, i.e., layers. The protocol layers are implemented in both ATs and APs. In accordance with the Open Systems Interconnection (OSI) model, protocol layer L1 provides for the transmission and reception of radio signals between the base station and remote station, layer L2 provides for the correct transmission and reception of signaling messages, and layer L3 provides for the control messaging for the communication system. Layer L3 originates and terminates signaling messages according to the semantics and timing of the communication protocol between ATs and APs.

In an IS-856 communication system, the air interface signaling layer L1 is referred to as the Physical Layer, L2 is referred to as the Link Access Control (LAC) Layer or the Medium Access Control (MAC) Layer, and L3 is referred to as the Signaling Layer. Above the Signaling Layer are additional layers, which in accordance with the OSI model are numbered L4-L7 and are referred to as the Transportation, Session, Presentation and Application Layers. A physical layer ARQ is disclosed in U.S. patent application Ser. No. 09/549,017, entitled "Method and Apparatus for Quick Re-transmission of Signals In A Communication System," filed Apr. 14, 2000, now U.S. Pat. No. 6,694,469, issued Feb. 17, 2004, assigned to the present assignee. An example of a link layer ARQ method is the Radio Link Protocol (RLP). RLP is a class of error control protocols known as not-acknowledge (NAK) based ARQ protocols. One such RLP is described in TIA/EIA/IS-707-A.8, entitled "DATA SERVICE OPTIONS FOR SPREAD SPECTRUM SYSTEMS: RADIO LINK PROTOCOL TYPE 2," hereinafter referred to as RLP2. The transmissions of both the original and a re-transmitted packets may be opportunistic.

Reverse Link Channels

Figure 4A:
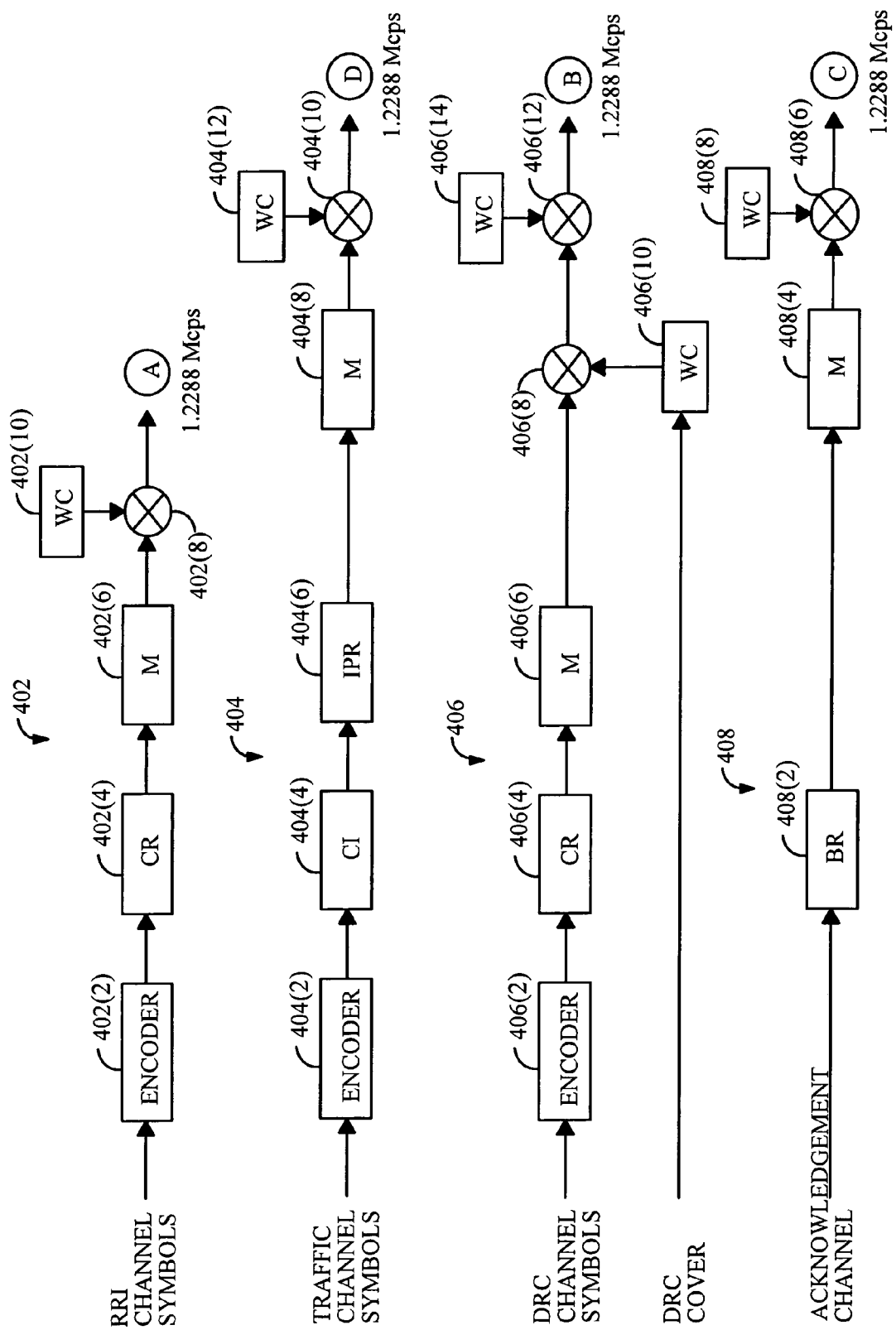
FIGS. 4A-4C illustrates the architecture for generating signals transmitted on a RL.
Figure 4B:
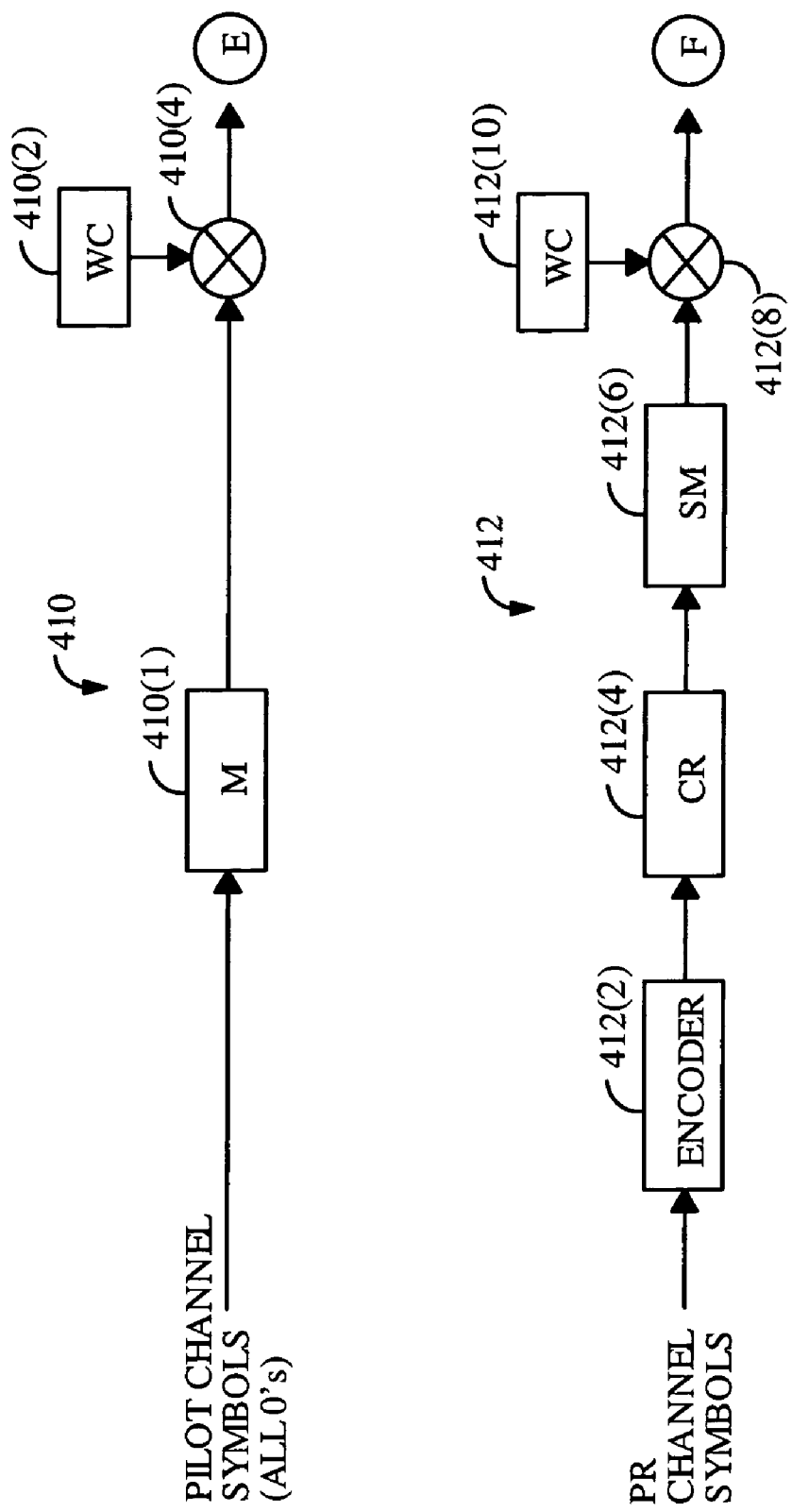
Figure 4C:
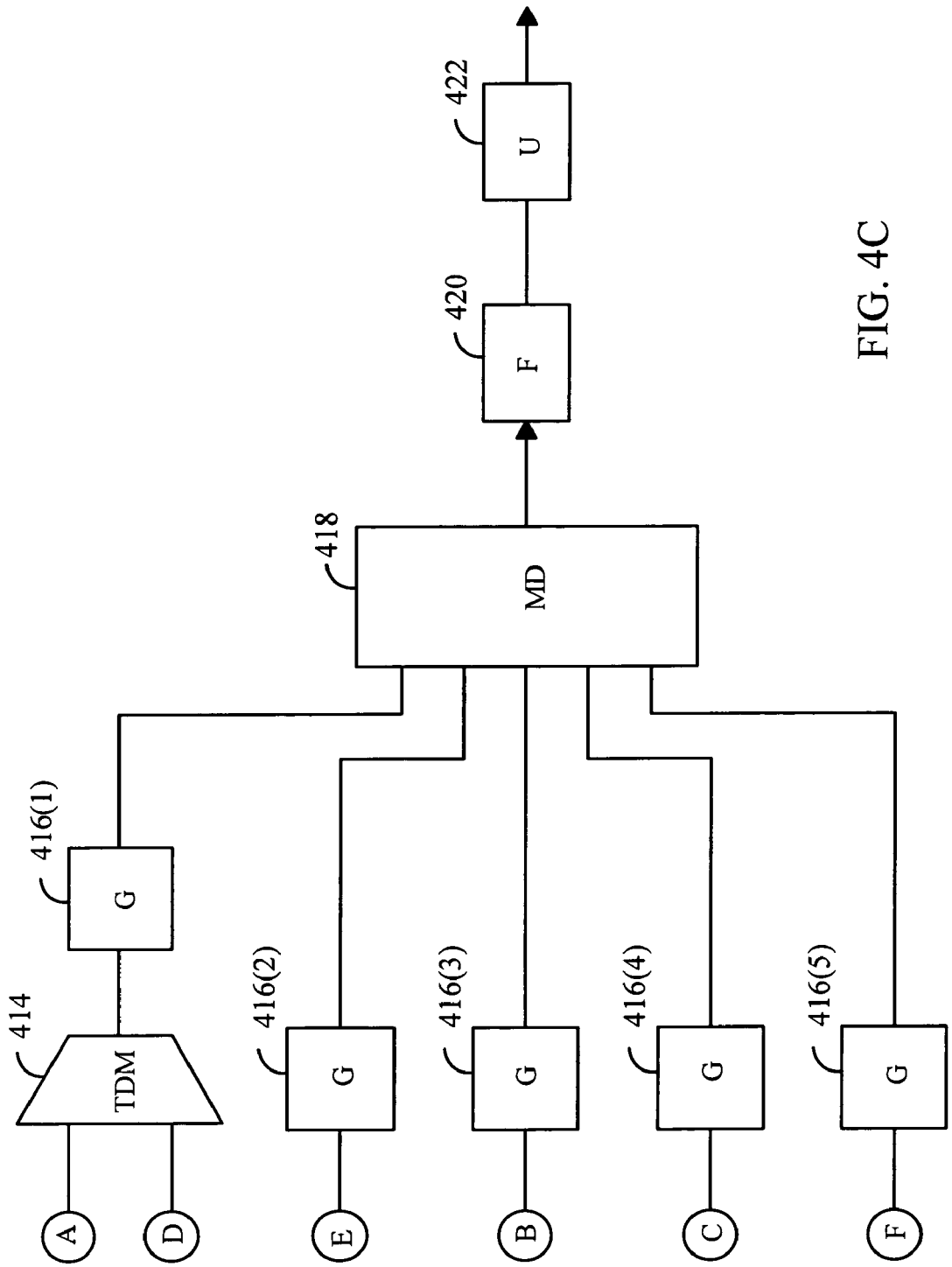

FIGS. 4A-4C illustrate an architecture for generating transmissions on an RL. As illustrated in FIGS. 4A-4B, the RL transmission comprises a Pilot Channel (PC) 410, a Data Request channel (DRC) 406, an Acknowledgement channel (ACK) 408, a Packet Request channel (PR) 412, and a RL Traffic channel 404, a Reverse Rate Indication channel (RRI) 402.

As described below, one example of RL waveform generated by the channel structure described in FIGS. 4A-4C and accompanying text, is defined in terms of frames, a frame being a structure comprising 16 time slots. Therefore, for tutorial purposes a time slot is adopted as a measure of a time interval. However, it will be appreciated that the concept of time interval may be extended to any other unit, i.e., multiple time slot, a frame, and the like.

Pilot Channel

The Pilot Channel portion 410 is used for coherent demodulation and estimation of a RL channel quality. The Pilot Channel portion 410 comprises unmodulated symbols with a binary value of '0'. The unmodulated symbols are provided to a block 410(1), which maps '0' binary valued symbols onto symbols with a value +1, and '1' binary valued symbols onto symbols with a value −1. The mapped symbols are covered with a Walsh code generated by a block 410(2), in block 410(4).

Data Request channel

The Data Request Channel portion 406 is used by the AT to indicate to the access network the selected serving sector and the requested data rate on the Forward Traffic Channel. The requested Forward Traffic Channel data rate comprises a four-bit DRC value. The DRC values are provided to a block 406(2), which encodes the four-bit DRC value to yield bi-orthogonal code words. The DRC codeword is provided to a block 406(4), which repeats each of the codeword twice. The repeated codeword is provided to a block 406(6), which maps '0' binary valued symbols onto symbols with a value +1, and '1' binary valued symbols onto symbols with a value −1. The mapped symbols are provided to a block 406(8), which covers each symbol with a Walsh code $W_i^8$ generated by a block 406(10), in accordance with a DRC cover identified by index i. Each resulting Walsh chip then provided to block 406(12), where the Walsh chips are covered by Walsh code $W_8^{16}$, generated by a block 406(14).

Reverse Rate Indication Channel

The RRI channel portion 402 provides an indication of a RL packet type. The packet type indication provides the AP with information that assists the AP in determining if soft-decisions from a currently received packet may be soft-combined with the soft-decisions from previously received packet(s). As discussed above, soft-combining takes advantage of soft-decision values, obtained from previously received packets. An AP determines bit values (hard-decision) of a packet by comparing energies at bit positions of a decoded packet (soft-decision values) against a threshold. If an energy corresponding to a bit is greater than the threshold, the bit is assigned a first value, e.g., '1', otherwise the bit is assigned a second value, e.g., '0'. The AP then ascertains, whether the packet decoded correctly, e.g., by performing a CRC check, or by any other equivalent or suitable method. If such test fails, the packet is considered erased. However, the AP saves the soft-decision values (if the number of re-transmission attempts for the packet is less than a maximum number of allowed attempts), and when the AP acquires soft-decision values of the next packet, it may combine the soft-decision values of the already received packets before comparing them against the threshold.

Methods of combining are well known and, therefore, need not be described here. One suitable method is described in detail in a U.S. Pat. No. 6,101,168, entitled "Method and Apparatus for Time Efficient Re-transmission Using Symbol Accumulation," assigned to the present assignee.

However, in order to meaningfully soft-combine packets, the AT must know that the packets comprise information that may be combined. The RRI value may comprise, for example, 3 bits. The Most Significant Bit (MSB) of the RRI indicates whether the packet is an original transmission or a re-transmission. The remaining two bits indicate one of four packet classes as determined in accordance with the packet's code rate, number of bits comprising the packet, and number of re-transmissions attempts. To enable soft-combining, the packet's code rate and number of bits comprising the packet remains remain the same in the transmission and re-transmission attempts.

The RRI value is provided to a block 402(2), which bi-orthogonally encodes the 3-bits to provide a codeword. An example of bi-orthogonal encoding is illustrated in Table 1.

TABLE 1

| RRI bits value | Codeword |
|---|---|
| 000 | 00000000 |
| 001 | 11111111 |
| 010 | 01010101 |
| 011 | 10101010 |
| 100 | 00110011 |
| 101 | 11001100 |
| 110 | 01100110 |
| 111 | 10011001 |

The codeword is provided to a block 402(4), which repeats each bit of the codeword. The repeated codeword is provided to a block 402(6), which maps '0' binary valued symbols onto symbols with a value +1, and '1' binary valued symbols onto symbols with a value −1. The mapped symbols are further provided to a block 402(8), which covers each symbol with a Walsh code generated by block 402(10), and the resulting chips are provided for further processing.

To support more then four packet classes, the RRI value may comprise, for example, four bits. The Most Significant Bit (MSB) of the RRI indicates whether the packet is an original transmission or a re-transmission. The remaining three bits indicate one of the packet classes. Again, the number of bits making up the packet remains the same in the transmission and re-transmission attempts.

The RRI value is provided to a block 402(2), which encodes the 4 bits into a 15 bit simplex codeword. An example of the simplex encoding is illustrated in Table 2.

TABLE 2

| Data Rate (kbps) | RRI Symbol | RRI code word |
|---|---|---|
| 76.8 (new) | 0 0 0 0 | 0 0 0 0 0 0 0 0 0 0 0 0 0 |
| 153.6 (new) | 0 0 0 1 | 0 1 0 1 0 1 0 1 0 1 0 1 |
| 230.4 (new) | 0 0 1 0 | 0 0 1 1 0 0 1 1 0 0 1 1 |
| 307.2 (new) | 0 0 1 1 | 0 1 1 0 0 1 1 0 0 1 1 0 |
| 460.8 (new) | 0 1 0 0 | 1 1 1 1 0 0 0 0 1 1 1 1 |
| 614.4 (new) | 0 1 0 1 | 1 0 1 0 0 1 0 1 1 0 1 0 |
| 921.6 (new) | 0 1 1 0 | 1 1 0 0 0 0 1 1 1 1 0 0 |
| 1,228.8 (new) | 0 1 1 1 | 1 0 0 1 0 1 1 0 1 0 0 1 |
| 76.8 (re) | 1 0 0 0 | 0 0 0 0 1 1 1 1 1 1 1 1 |
| 153.6 (re) | 1 0 0 1 | 0 1 0 1 1 0 1 0 1 0 1 0 |
| 230.4 (re) | 1 0 1 0 | 0 0 1 1 1 1 0 0 1 1 0 0 |
| 307.2 (re) | 1 0 1 1 | 0 1 1 0 1 0 0 1 1 0 0 1 |
| 460.8 (re) | 1 1 0 0 | 1 1 1 1 1 1 1 1 0 0 0 0 |
| 614.4 (re) | 1 1 0 1 | 1 0 1 0 1 0 1 0 0 1 0 1 |
| 921.6 (re) | 1 1 1 0 | 1 1 0 0 1 1 0 0 0 0 1 1 |
| 1,228.8 (re) | 1 1 1 1 | 1 0 0 1 1 0 0 1 0 1 1 0 |

Alternatively, the RRI symbols may be used to indicate a range of rates. For example, when the RRI symbols comprise four bits, each of the eight combinations (e.g., 0000, 0001, 0010, 0011, 0100, 0101, 0110, 0111) may indicate a pair of rates of data. Again, the Most Significant Bit (MSB) of the RRI indicates that the packet is an original transmission.

Once the RRI symbols are decoded, the decoder performs blind rate of data determination in accordance with two hypothesis, one hypothesis in accordance with the first rate of data of the pair of rates of data determined in accordance with the RRI symbols, and second hypothesis in accordance with the second rate of data of the pair of rates of data determined in accordance with the RRI symbols. Similarly, the eight combinations (e.g., 1000, 1001, 1010, 1011, 1100, 1101, 1110, 1111) indicate a pair of rates of data of a re-transmitted packet.

Alternatively, two parallel decoders may be used, one decoder decoding the data in accordance with one rate of data, and the second decoder decoding the data in accordance with the second rate of data.

The concept of indirect rate of data indication may be extended to any number of the rates of data to be indicated by a bit combination, the only limitation being the decoder(s)' ability to decode the number of the rates of data before the next data to be decoded is received. Consequently, if the decoder can decode all the rates of data, the RRI symbol may comprise one bit, indicating whether the packet is new transmission or a re-transmission.

Further processing of the codewords proceeds as described above.

Packet Ready Channel

Each AT desiring to transmit user data indicates to the user terminal's serving sector that user data are available for transmission in a future time slot and/or that the future time slot transmission is opportune. A time slot is deemed to be opportune if an instantaneous quality metric of the RL channel time slot exceeds the average quality metric of that RL channel modified by an opportunity level determined in accordance with additional factors, depending on a design of the communication system, exceeds a threshold.

The quality metric of the RL is determined in accordance with a reverse pilot channel, e.g., in accordance with an equation (1):

$$\frac{Filt\_TX\_Pilot(n)}{TX\_Pilot(n)} \quad (1)$$

where Tx_Pilot(n) is an energy of a pilot signal during an n-th time slot; and

Filt_Tx—Pilot(n) is an energy of a pilot signal filtered over past k slots. The filter time-constant, expressed in slots, is determined to provide adequate averaging of the RL channel.

Consequently, Equation (1) indicates how much better or worse the instantaneous RL is with respect to the average RL. The AT performs the:

Tx_Pilot(n) and Filt_Tx—Pilot(n)

measurements, and the quality metrics calculation in accordance with Equation (1) at every time slot. The calculated quality metric is then used to estimate quality metrics for a determined number of time slots in the future. The determined number of time slots is two. A method for such quality estimation is described in detail in U.S. patent application Ser. No. 09/974,933, entitled "METHOD AND APPARATUS FOR SCHEDULING TRANSMISSIONS CONTROL IN A COMMUNICATION SYSTEM," filed Oct. 10, 2001, now U.S. Pat. No. 6,807,426 issued Oct. 19, 2004, assigned to the present assignee.

The above-described method of estimating RL quality metric is given as an example only. Thus, other methods, for example a method utilizing a SINR predictor disclosed in detail in U.S. patent application Ser. No. 09/394,980, entitled "SYSTEM AND METHOD FOR ACCURATELY PREDICTING SIGNAL-TO-INTERFERENCE-AND-NOISE RATIO TO IMPROVE COMMUNICATIONS SYSTEM PERFORMANCE," filed Sep. 13, 1999, now U.S. Pat. No. 6,426,971, issued Jul. 30, 2002, assigned to the present assignee, may be used.

The factors determining the opportunity level comprise, e.g., a maximum acceptable transmission delay t (from arrival of a packet at the AT to the packet transmission), a number of packets in the queue at the AT I (transmit queue length), and an average throughput over the RL. The above-mentioned factors define an "impatience" function I(t,I,th). The impatience function I(t,I,th) is determined in accordance with the desired influence of the input parameters. For example, immediately following a first packet arrival for transmission to the AT's queue, the impatience function has a low value, but the value increases if the number of packets in the AT's queue exceeds a threshold. The impatience function reaches a maximum value when the maximum acceptable transmission delay is reached. Queue length parameter and transmit throughput parameter affect the impatience function similarly.

Use of the above-mentioned three parameters as inputs to the impatience function is given for the purposes of explanation only; any number or even different parameters may be used in accordance with design considerations of a communication system. Additionally, the impatience function may be different for different users, thus providing user differentiation. Furthermore, functions other than the impatience function may be used to differentiate among users. Thus for example, each user may be assigned an attribute in accordance with the user's QoS. The attribute itself may serve in lieu of the impatience function. Alternatively, the attribute may be used to modify the input parameters of the impatience function.

The impatience function I(t,I,th) may be used to modify the quality metric in accordance with equation (2):

$$\frac{Filt\_TX\_Pilot(n)}{TX\_Pilot(n)} \cdot I(t, l, th) \quad (2)$$

The relationship between the values calculated from Equation (2) and a threshold $T_J$ may be used to define opportunity levels. A set of suitable opportunity levels is given in Table 3 as a way of example. It will be appreciated that a different number of opportunity levels and different definitions may be used instead.

TABLE 3

| Opportunity Level | Definition |
| --- | --- |
| 0 | No Data to Transmit |
| 1 | Data available for transmission |
| 2 | Data available for transmission, channel condition "GOOD" OR Impatience to transmit "HIGH" |
| 3 | Data available for transmission, channel condition "VERY GOOD" OR Impatience to transmit "VERY HIGH" |

The appropriate opportunity level is encoded and transmitted over the PR channel. The PR channel is transmitted if an opportunity level other than 0, i.e., "no data to transmit" is to be indicated. The above-described four opportunity levels may be represented as two information bits. The PR channel should be received at an AP with a high reliability because any error during the PR channel reception may result in possible scheduling of an AT that has not requested user data transmission or reported low opportunity level. Alternatively, such an error may result in failure to schedule an AT that reported high opportunity level. Consequently, the two information bits need to be delivered with sufficient reliability.

As described above, the opportune transmit time slot is implied because both the AP and the AT have knowledge of a pre-determined number of time slots in the future, for which the opportune level has been estimated. Because the timing of the APs and ATs is synchronized, the AP is able to determine which time slot is the opportune transmit time slot for which the transmit terminal reported the opportunity level. However, it will be appreciated that other arrangements may be employed, in which the opportune transmit time slot is variable, and is explicitly communicated to the AP.

The PR channel 412 value in accordance with the above-described concepts is expressed as a 2-bit value. The PR value is provided to a block 412(2), which encodes the 2-bits to provide a codeword. The codeword is provided to a block 412(4), which repeats each of the codeword. The repeated codeword is provided to a block 412(6), which maps '0' binary valued symbols onto symbols with a value +1, and '1' binary valued symbols onto symbols with a value −1. The mapped symbols are then provided to a block 412(8), which covers each symbol with a Walsh code generated by block 412(10).

ACK Channel

The ACK channel portion 408 is used by the AT to inform the access network whether a packet transmitted on the Forward Traffic Channel has been received successfully or not. The AT transmits an ACK channel bit in response to every Forward Traffic Channel slot that is associated with a detected preamble directed to the AT. The ACK channel bit may be set to '0' (ACK) if a Forward Traffic Channel packet has been successfully received; otherwise, the ACK channel bit may be set to '1' (NAK). A Forward Traffic Channel packet is considered successfully received if a CRC checks. The ACK channel bit is repeated in a block 408(2), and provided to a block 408(4). Block 408(4) maps '0' binary valued symbols onto symbols with a value +1, and '1' binary valued symbols onto symbols with a value −1. The mapped symbols are then provided to a block 408(6), which covers each symbol with a Walsh code generated by block 408(8).

When an AT is in a soft handoff, the packet may be decoded only by the serving sector.

Traffic Channel

Consistent with the above-formulated RL requirement, the Traffic Channel portion 404 transmits packets at the data rates, ranging from 153.6 kbps to 2.4 Mbps. The packets are encoded in block 404(2) with coding rates, depending on the data rate. The block 404(2) comprises turbo-encoder with coding rates ⅓ or ⅕. The sequence of binary symbols at the output of the block 404(2) is interleaved by a block 404(4). The block 404(4) may comprise a bit-reversal channel interleaver. Depending on the data rate and encoder code rate, the sequence of interleaved code symbols is repeated in block 404(6) as many times as necessary to achieve a fixed modulation symbol rate, and provided to a block 404(8). Block 404(8) maps '0' binary valued symbols onto symbols with a value +1, and '1' binary valued symbols onto symbols with a value −1. The mapped symbols are then provided to a block 404(10), which covers each symbol with a Walsh code generated by block 404(12).

Revere Link Architecture

FIG. 4C further illustrates the architecture of a RL channel. Traffic Channel portion 404, and the RRI portion channel 402 are time division multiplexed in block 414, and provided to gain adjustment block 416(1). After the gain adjustment, the time division multiplexed signal is provided to a modulator 418.

The Pilot Channel portion 410, the Data Request channel (DRC) portion 406, the Acknowledgement channel (ACK) portion 408, the Packet Ready channel (PR) portion 412, are provided to the respective gain adjustment blocks 416(2)-416(5). After the gain adjustment, the respective channels are provided to the modulator 418.

The modulator 418 combines the incoming channel signals, and modulates the combined channel signals in accordance with an appropriate modulation method, e.g., a binary phase-shift keying (BPSK), a quadrature phase-shift keying (QPSK), quadrature amplitude modulation (QAM), 8-phase-shift keying (8-PSK), and other modulation methods known to one of ordinary skill in the art. The appropriate modulation method may change in accordance with a rate of data to be transmitted, channel condition, and/or other design parameter of the communication system. The combining of the incoming channel signals will change accordingly. For example, when a selected modulation method is QPSK, the incoming channel signals will be combined onto an In-phase and Quadrature signals, and these signals will be quadrature spread. The selection of channel signals are combined on the In-phase and Quadrature signals in accordance with design parameter of the communication system, for example distributing the channels so that the data load between the In-phase and Quadrature signals is balanced.

The modulated signal is the filtered in block 420, upconverted to a carrier frequency in block 422, and provided for transmission.

Revere Link Waveform

Figure 5A:
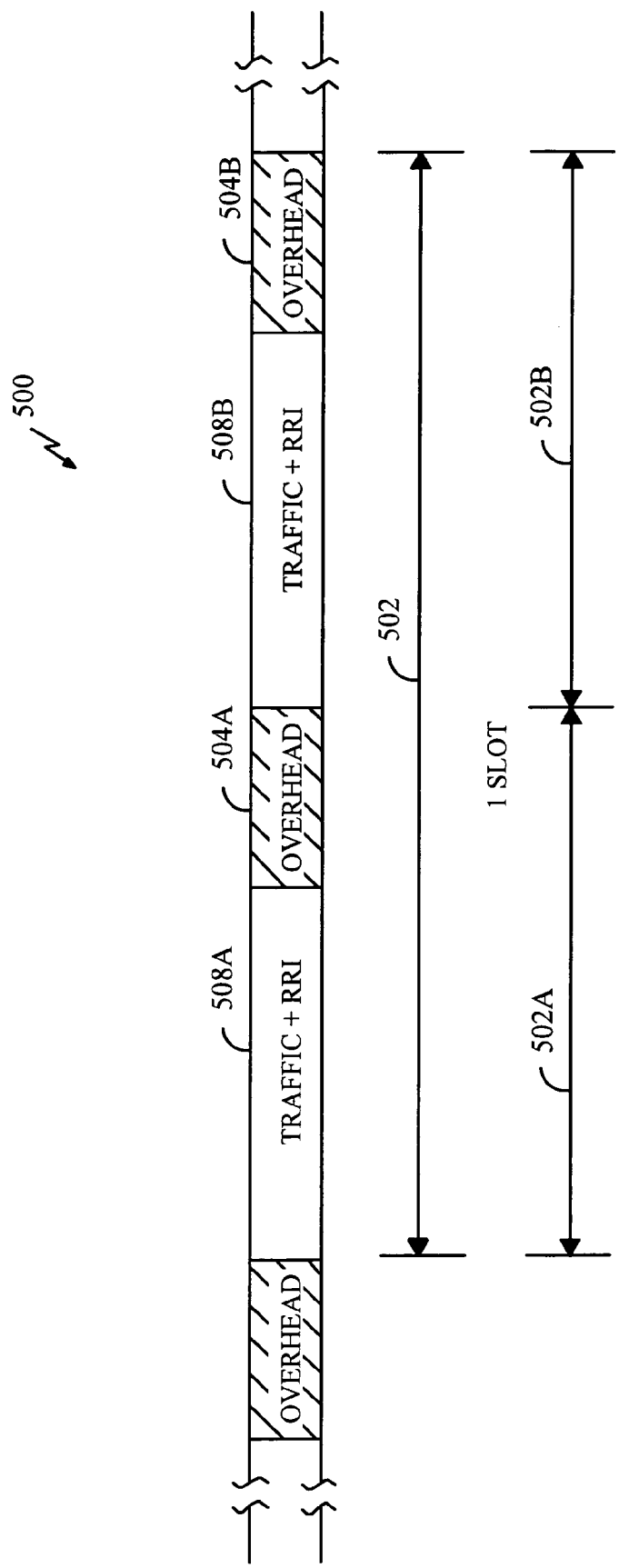
FIG. 5A illustrate a RL waveform over one time slot, in an embodiment in which overhead channel bursts are transmitted at the end of each half slot.

An RL 500 generated by the channel structure described in FIGS. 4A-4C and accompanying text above is illustrated in FIG. 5A. The RL 500 is defined in terms of frames. A frame is a structure comprising 16 time slots 502, each time slot 502 being 2048 chips long, corresponding to a 1.66 ms time slot duration, and, consequently, a 26.66 ms frame duration. Each time slot 502 is divided into two half-time slots 502A, 502B, with overhead channel bursts 504A, 504B transmitted within each half-time slot 502A, 502B. Each overhead channel burst 504A, 504B is 256 chips long, and is transmitted at the end of its associated half-time slot 502A, 502B. The overhead channel bursts 504A, 504B comprise code division multiplexed channels. These channels comprise a pilot channel signal covered by a first Walsh code, a DRC covered by a second Walsh code, an ACK channel covered by a third Walsh code, and a PR channel covered by a fourth Walsh code.

The RL traffic channel payload and RRI channel are sent in the remaining portions 508A of the first half-time slot 502A and the remaining portions 508B of the second half-time slot 502B. The division of the time slot 502 between the overhead channel bursts 504A, 504B and the RL traffic channel payload and RRI channel 508A, 508B is determined in accordance with a rise over thermal during the overhead channel bursts 504A, 504B, data throughput, link budget, and other suitable criteria.

Illustrated in FIG. 5A, the time division multiplexed RRI channel and the traffic channel payload are transmitted at the same power level. The power distribution between the RRI channel and the traffic channel is controlled by the number of chips allocated to the RRI channel. The number of chips is allocated to the RRI channel as a function of the transmitted data rate, will be explained below.

It will be appreciated that other methods of combining the RL channels, and, consequently resulting RL waveforms are possible in accordance with design criteria of the communication system. Thus, the above-described RL waveform separates one of the overhead channels, the RRI channel, which needs to be decoded with a high degree of reliability, from the remaining overhead channels. Thus, the remaining overhead channels do not present interference to the RRI channel.

In order to further improve the reliability of the RRI channel decoding, the number of chips allocated to the RRI channel is kept constant. This in turn requires different power to be transmitted in the RRI channel portion of the traffic/RRI channel time-slots 508A, 508B at a different power level than in the traffic channel portion. Such a consideration may be justified by improved decoding performance, resulting from the decoder taking advantage of knowledge that the number of RRI channel chips is fixed, and knowledge of power at which the RRI channel was transmitted.

Figure 5B:
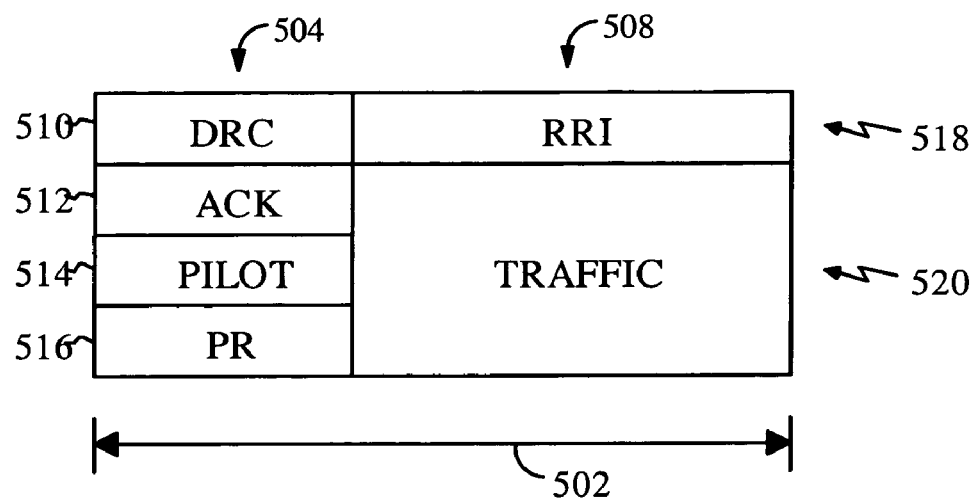
FIG. 5B illustrates a RL waveform over one time slot, in an embodiment in which the Reverse Rate Indicator (RRI) channel and the reverse Traffic Channel, covered by a unique Walsh codes, are transmitted concurrently.

The RRI channel and the Traffic channel are transmitted concurrently, being separated by a different codes, e.g., by being covered by different Walsh codes, as illustrated in FIG. 5B. Accordingly, each half-time slot 502 comprises an overhead channel portion 504, and an RRI and traffic channel portion 508. The overhead channel portion 504 comprises the DRC 510, the ACK 512, the PC 514, and the PR 516. The overhead channels are distinguished by different codes, e.g., by being covered by different Walsh codes. The RRI 518 is covered by different Walsh code than the traffic channel payload 520. The power, allocated between the separate RRI channel and the Traffic channel is determined in accordance with the data rate being transmitted.

Figure 5C:
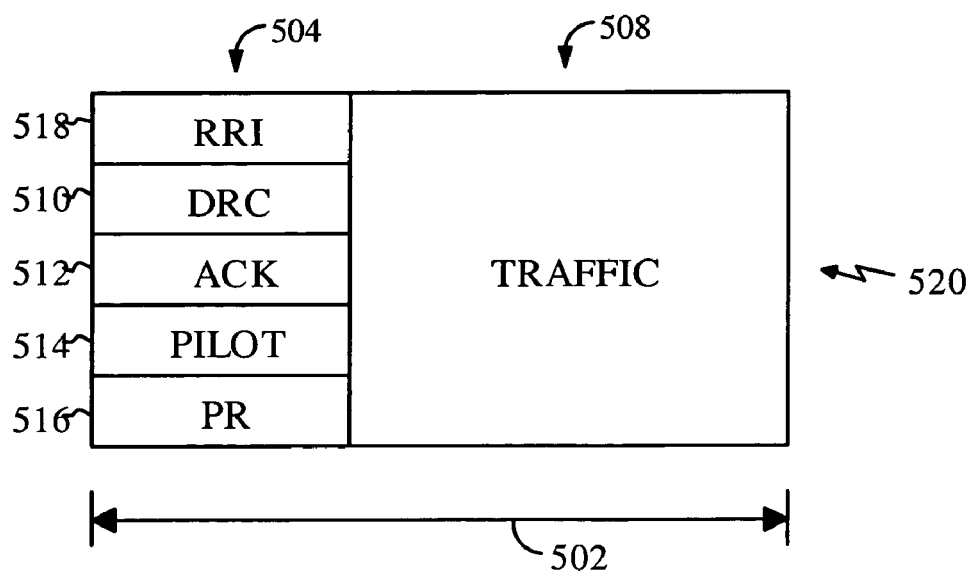
FIG. 5C illustrates a RL waveform, over one time slot, in an embodiment in which the overhead channels and the reverse Traffic Channel are transmitted using Time Division Multiplex (TDM) techniques.

The overhead channels and the Traffic channel are transmitted using time division mode, as illustrated in FIG. 5C. Accordingly, each half-time slot 502 comprises an overhead channel portion 504, and a traffic channel portion 508. The overhead channel portion 504 comprises the DRC 510, the ACK 512, the PC 514, the PR 516, and the RRI 518. The overhead channels are distinguished by different codes, e.g., by being covered by different Walsh codes. An advantage of the above-described RL waveform is simplicity.

It will be appreciated that the above-described teaching is applicable to different waveforms. Thus, for example, the waveform does not need to contain pilot signal bursts, and the pilot signal may be transmitted on a separate channel, which may be continuous or bursty.

Reverse Link Data Transmission

As discussed earlier, the RL transmission occurs from at least one AT in an interval. For tutorial purposes only, the RL data transmission as described below uses an interval equal to a time slot. The RL transmission is scheduled by an entity in an access network in response to the ATs' request to convey user data. The AT is scheduled in accordance with the quality metric of the AT's channel in the interval on the RL, the AT's average RL quality metric, and an impatience function.

Figure 6:
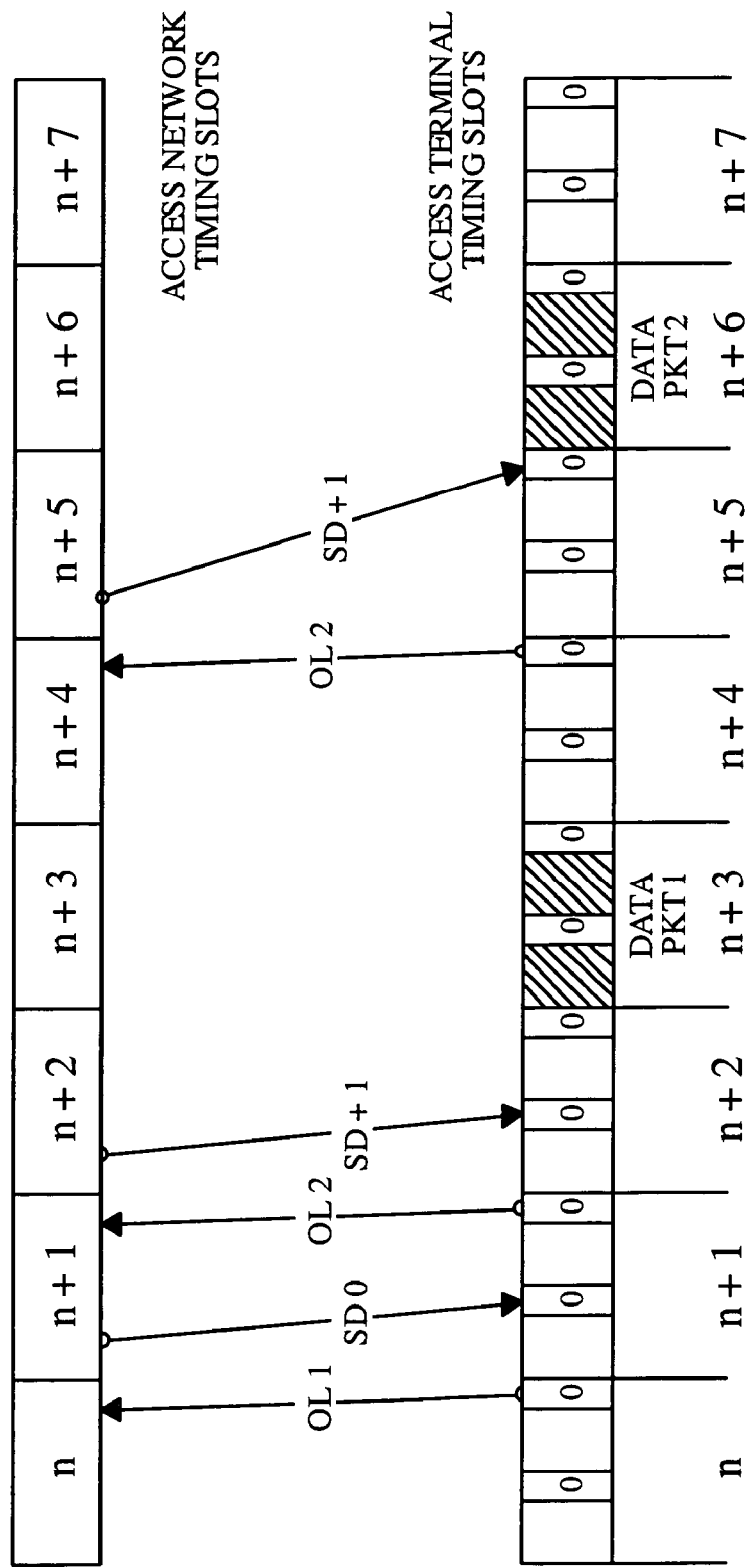
FIG. 6 illustrates a RL data transmission.

One example of the RL data transmission is shown and will be explained with reference to FIG. 6. FIG. 6 illustrates RL data transmission negotiation for one AT for the sake of understanding. The concepts may be to multiple ATs. Furthermore, only the serving AP is shown. It is understood from a previous description, how the ACK and NACK transmission from non-serving terminals affect the RL data transmission.

Because the access procedure, serving sector selection, and other call setup procedures are based on the like functions of the communication system in accordance with the IS-856 standard as described above, they are not repeated. The AT (not shown) having received data to be transmitted evaluates the AT's RL quality metric and impatience function, and generates an opportunity level (OL 1). The AT further generates the packet data type and estimates the data rate. As discussed, the packet data type designates the packet as original or re-transmitted. As described in more detail below, the rate determination method determines a maximum supportable rate in accordance with the AT's maximum transmit power, transmit power allocated to a pilot channel and an amount of data to be transmitted. The AT then communicates the packet data type and the requested data rate over the RRI channel, and the opportunity level over the PR channel of the RL in slot n.

A serving AP (not shown) of the access network receives the RL and decodes the information contained in slot n. The serving AP then provides the opportunity level, the packet data type, and the requested data rate of all ATs requesting permission to transmit data to a scheduler (not shown). The scheduler schedules packets for transmissions in accordance with scheduling rules. As discussed, the scheduling rules attempt to minimize mutual RL interference among ATs while achieving the required QoS or data distribution fairness. The rules include:

i. precedence to transmit is given to the AT reporting the highest opportunity level;
ii. in the event that several ATs report an identical opportunity level, precedence is given to the AT with lower transmitted throughput; and
iii. in the event that several ATs satisfy rules (i) and (ii) the AT is selected at random; and a permission to transmit is given to one of the ATs with data available for transmission even if the reported opportunity level is low in order to maximize RL utilization.

After having made a scheduling decision, the serving AP transmits the scheduling decision for each of the ATs requesting permission to transmit on the PG channel.

The AT receives the PG channel, decodes the scheduling decision (SD 0), and abstains from packet transmission. Because the AT has data to be transmitted, the AT again evaluates the AT's RL quality metric and impatience function, and this time generates a new opportunity level (OL 2). The AT further generates the packet data type and estimates the data rate, and provides the packet data type and the requested data rate over RRI channel, and the opportunity level over the PR channel of the RL in slot n+1.

The serving AP receives the RL and decodes the information contained in slot n+1. The serving AP then provides the opportunity level, the packet data type, and the requested data rate of all ATs requesting permission to transmit data to the scheduler. After having made scheduling decision, the serving AP transmits the scheduling decision for each of the ATs requesting permission to transmit on the PG channel. As shown in FIG. 6, the serving AP transmits a scheduling decision SD +1 granting the AT permission to transmit a new packet.

The AT receives the PG channel and decodes the scheduling decision SD +1. The AT evaluates the AT's RL quality metric and impatience function. As illustrated in FIG. 6, the AT determined an opportunity level equal to 0, i.e., no data available for transmission, consequently, the AT does not transmit PR channel in time-slot n+2. Likewise, the AT determined an opportunity level equal to 1 for slot n+3, consequently, the AT, transmits the user data in the payload portions of the RL traffic channel in the opportune time slot n+3.

At time slot n+4, the AT has data to be transmitted. The AT evaluates the AT's RL quality metric and impatience function, and generates an opportunity level (OL 2). The AT further generates the packet data type and estimates the data rate, and provides the packet data type and the requested data rate over a RRI channel, and the opportunity level over the PR channel of the RL in slot n+4.

The serving AP receives the RL and decodes the information contained in slot n+4. The serving AP then provides the opportunity level, the packet data type, and the requested data rate of all ATs requesting permission to transmit data to the scheduler. After having made scheduling decision, the serving AP transmits the scheduling decision for each of the ATs requesting permission to transmit on the PG channel. As shown in FIG. 6, the payload sent over the RL in slot n+3 was correctly decoded at the access network. Consequently, the serving AP transmits a scheduling decision SD +1 granting the AT permission to transmit a new packet.

Only the serving AP receives and decodes the RL from the transmitting AT, consequently, the serving AP scheduler makes the scheduling decision solely on the information provided by the serving AP. The other APs of the access network also receive and decode the RL from the transmitting AT and provide information whether the payload was successfully decoded to the serving AP. Consequently, if any of the APs of the access network successfully decoded the payload, the serving AP indicates an ACK over the PG channel, thus preventing unnecessary re-transmission. All the APs that received the payload information send the payload information to a centralized entity to perform soft-decision decoding. The central decoder then notifies the serving AP whether the payload decoding was successful.

The AT receives the PG channel and decodes the scheduling decision SD +1. The AT evaluates the AT's RL quality metric and impatience function. As illustrated in FIG. 6, the AT determined an opportunity level equal to 0, i.e., no data available for transmission, consequently, the AT does not transmit PR channel in time-slot n+5. Likewise, the AT determined an opportunity level equal to 1 for slot n+6, consequently, the AT, transmits the user data in the payload portions of the RL traffic channel in the opportune time slot n+6.

Figure 7:
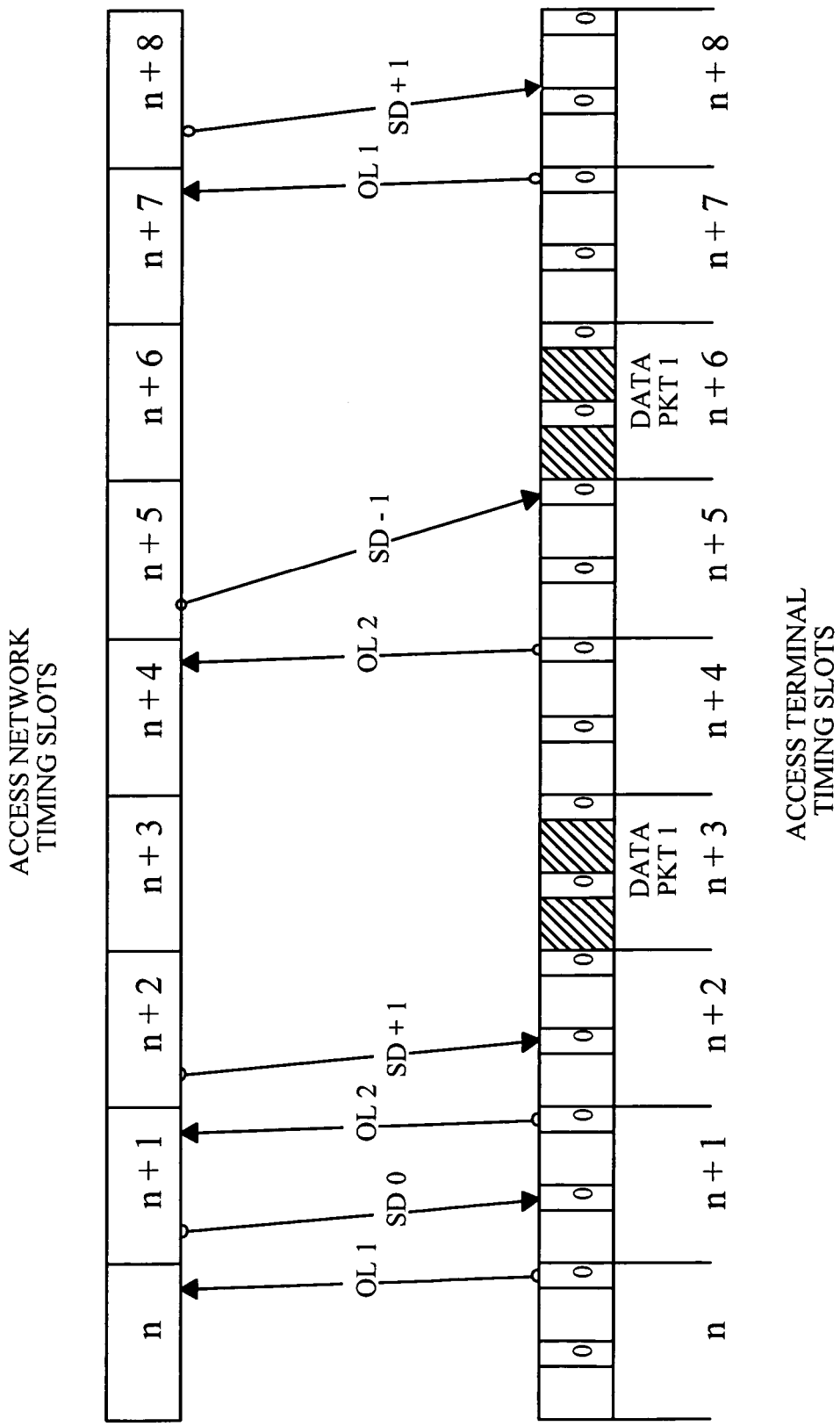
FIG. 7 illustrates a RL data re-transmission.

The case for the access network failing to correctly decode the payload sent over the RL in slot n+3 is illustrated in FIG. 7. To request re-transmission of the payload sent over the RL in slot n+3, the serving AP communicates over the PG a scheduling decision SD −1 granting the AT permission to retransmit the old packet.

The AT receives the PG channel and decodes the scheduling decision SD −1. The AT evaluates the AT's RL quality metric and impatience function. As illustrated in FIG. 7, the AT determined an opportunity level equal to 0, i.e., no data available for transmission, consequently, the AT does not transmit PR channel in time slot n+5. Likewise, the AT determined an opportunity level equal to 1 for slot n+6, consequently, the AT, transmits the user data in the payload portions of the RL traffic channel in the opportune time slot n+6.

At time slot n+7, the AT has data to be transmitted. The AT evaluates the AT's RL quality metric and impatience function, and generates an opportunity level (OL 1). The AT further generates the packet data type and estimates the data rate, and provides the packet data type and the requested data rate over an RRI channel, and the opportunity level over the PR channel of the RL in slot n+7.

The serving AP receives the RL and decodes the information contained in slot n+6. The serving AP then provides the opportunity level, the packet data type, and the requested data rate of all ATs requesting permission to transmit data to the scheduler. After having made scheduling decision, the serving AP transmits the scheduling decision for each of the ATs requesting permission to transmit on the PG channel. As shown in FIG. 7, the retransmitted payload sent over the RL in slot n+6 was correctly decoded at the access network. Consequently, in response to the AT's opportunity level sent in time slot n+7, the serving AP transmits a scheduling decision SD +1 granting the AT permission to transmit a new packet.

It will be appreciated that the serving AP may schedule an AT in accordance with their latest received request for transmission.

It will be appreciated that the packet access network may not receive the data packet even upon several re-transmission attempts. To prevent excessive re-transmission attempts, the communication system may give up re-transmission attempts after a determined number of re-transmission attempts (persistence interval). The missing packet is then handled by a different method, e.g., a Radio Link Protocol (RLP).

Reverse Link Power Control

As discussed, only one AT in a sector is transmitting data traffic on the RL. Because in the CDMA communication system all terminals are transmitting on the same frequency, each transmitting AT acts as a source of interference to the ATs in adjacent sectors. To minimize such an interference on the RL and maximize capacity, the transmit power of the pilot channel for each AT is controlled by two power control loops. The transmit power of the remaining overhead channels is then determined as a fraction of the transmit power of the pilot channel. The transmit power of the traffic channel is determined as a traffic-to-pilot power ratio for a given data rate, corrected by a rise over thermal differential between the overhead and traffic transmission intervals. Rise over thermal is a difference between a receiver noise floor and a total received power as measured by the AT.

Pilot Channel Power Control

The pilot channel power control loops are similar to that of the CDMA system disclosed in detail in U.S. Pat. No. 5,056,109, entitled "METHOD AND APPARATUS FOR CONTROLLING TRANSMISSION POWER IN A CDMA CELLULAR MOBILE TELEPHONE SYSTEM," assigned to the present assignee and incorporated by reference herein. Other power control methods are also contemplated and are within the scope of the present invention.

The first power control loop (outer loop), adjusts a set point so that a desired level of performance, e.g., a DRC channel erasure rate, is maintained. The set point is updated every two frames following selection diversity at the APs, i.e., the set point is increased only if the measured DRC erasure rate exceeds a threshold at all the APs in the active set of the AT, and decreased if the measured DRC erasure rate is below the threshold at any of the APs.

The second power control loop (inner loop) adjusts the transmit power of the AT so that the RL quality metric is maintained at the set point. The quality metric comprises an Energy-per-chip-to-Noise-plus-interference ratio (Ecp/Nt), and is measured at the AP receiving the RL. Consequently, the set point is also measured in Ecp/Nt. The AP compares the measured Ecp/Nt with the power control set point. If the measured Ecp/Nt is greater than the set point, the AP transmits a power control message to the AT to decrease the AT's transmit power. Alternatively, if the measured Ecp/Nt is below the set point, the AP transmits a power control message to the AT to increase the AT's transmit power. The power control message is implemented with one power control bit. A first value for the power control bit ("up") commands the AT to increase the AT's transmit power and a low value ("down") commands AT to decrease the AT's transmit power.

The power control bits for all ATs in communication with each AP are transmitted on the RPC of the FL.

Remaining Overhead Channel Power Control

Once the transmit power of the pilot channel for a time slot is determined by the operation of the power control loops, the transmit power of each of the remaining overhead channels is determined as a ratio of the transmit power of the specific overhead channel to the transmit power of the pilot channel. The ratios for each overhead channel are determined in accordance with simulations, laboratory experiments, field trials and other engineering methods.

Traffic Channel Power Control

The required transmit power of the traffic channel is also determined in accordance with the transmit power of the pilot channel. The required traffic channel power is computed using the following formula:

$$P_t = P_{pilot} \cdot G(r) \cdot A \tag{3}$$

where: Pt is the transmit power of the traffic channel;
Ppilot is the transmit power of the pilot channel;
G(r) is a traffic-to-pilot transmit power ratio for a given data rate r; and
A is a rise over thermal (ROT) differential between the overhead and traffic transmission intervals.

The measurement of the ROT in the overhead transmission interval (ROT overhead) and the traffic (ROT traffic) transmission interval, needed for calculation of A at the AP is disclosed in U.S. Pat. No. 6,192,249 entitled "Method and apparatus for RL loading estimation," assigned to the present assignee. Once the noise in both the overhead and traffic transmission intervals are measured, the A is computed using the following formula:

$$A = ROT_{traffic} - ROT_{overhead} \tag{4}$$

The computed A is then transmitted to the AT. A is transmitted over the RA channel. The value of A is then adjusted by the AT in accordance with the RL packet error rate (PER) determined in accordance with the ACK/NAK received from the AP, on the PG channel, so that a determined PER is maintained in a maximum allowed number of transmissions of a given packet. The RL packet error rate is determined in accordance with ACK/NACK of the RL packets. The value of A is increased by a first determined amount if an ACK has been received within N re-transmission attempts of the maximum M re-transmission attempts. Similarly, the value of A is decreased by a second determined amount if an ACK has not been received within N re-transmission attempts of the maximum M re-transmission attempts.

Alternatively, A represents an estimate of the ROT differential given by Equation (3) (4) at a subscriber station. An initial value of A is determined in accordance with simulations, laboratory experiments, field trials and other suitable engineering methods. The value of A is then adjusted in accordance with the reverse link packet error rate (PER) so that a determined PER is maintained in a maximum allowed number of transmissions of a given packet. The reverse link packet error rate is determined in accordance with ACK/NACK of the reverse link packets as described above. The value of A is increased by a first determined amount if an ACK has been received within N re-transmission attempts of the maximum M re-transmission attempts. Similarly, the value of A is decreased by a second determined amount if an ACK has not been received within N re-transmission attempts of the maximum M re-transmission attempts.

From Equation (3), it follows that the traffic channel transmit power is a function of the data rate r. Additionally, an AT is constrained in the maximum amount of transmit power (Pmax). Therefore, the AT initially determines how much power is available from the Pmax and the determined Ppilot. The AT then determines the amount of data to be transmitted, and selects the data rate r in accordance with the available power and the amount of data. The AT then evaluates Equation (3) to determine, whether the effect of the estimated noise differential Δ did not result in exceeding the available power. If the available power is exceeded, the AT decreases the data rate r and repeats the process.

The AP may control the maximum data rate that an AT may transmit by providing the AT with a maximum allowed value G(r).A via the RA channel. The AT then determines the maximum amount of transmit power of the RL traffic channel, the transmit power of the RL pilot channel, and uses Equation (3) to calculate the maximum data rate supportable.

RRI Channel Power Control

As discussed above, the transmit power of the overhead channels is determined as a ratio of the transmit power of the specific overhead channel to the transmit power of the pilot channel.

To avoid the need to transmit the RRI portion of the traffic/RRI channel time slot at a different power level than the traffic portion, the traffic/RRI channel portion of the time slot is transmitted at the same power. To achieve the correct power distribution for the RRI channel, a different number of chips is allocated to the RRI channel as a function of the transmitted data rate.

To ensure correct decoding of a determined number of chips comprising a Walsh covered codeword, a required power may be determined. Alternatively, if the power for traffic/payload necessary for a transmission is known, and the RRI portion of the traffic/RRI channel time slot is transmitted at the same power, the number of chips adequate for reliable RRI channel decoding may be determined. Consequently, once the data rate, and, therefore, the power for transmission of the traffic/RRI channel time slot is determined, so is the number of chips allocated to the RRI channel. The AT generates the RRI channel bits, encodes the bits to obtain symbols, and fills the number of chips allocated to the RRI channel with the symbols. If the number of chips allocated to the RRI channel is greater than the number of symbols, the symbols are repeated until all the chips allocated to the RRI channel are filled.

Alternatively, the RRI channel is time-division-multiplexed with the traffic channel payload and the RRI portion of the traffic/RRI channel time slot comprises a fixed number of chips. Furthermore, the power level of the RRI channel is not determined in accordance with the transmit power of the pilot channel, but is assigned a fixed value in accordance with a desired QoS, and is communicated to each AT by an AP. The fixed value for a desired quality metric of RRI channel reception is determined in accordance with simulations, laboratory experiments, field trials and other engineering methods.

Figure 8:
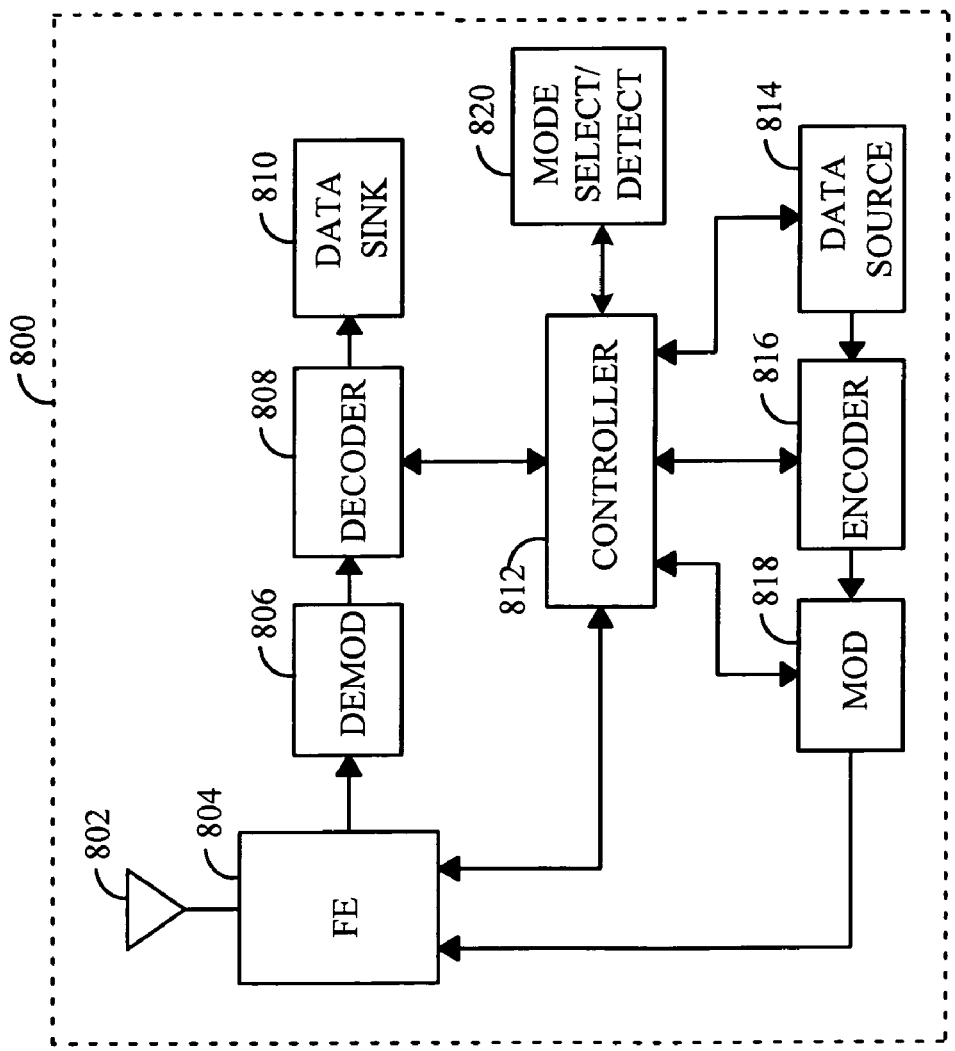
FIG. 8 illustrates a subscriber station.

AT 800 is illustrated in FIG. 8. FL signals are received by antenna 802 and routed to a front end 804 comprising a receiver. The receiver filters, amplifies, demodulates, and digitizes the signal provided by the antenna 802. The digitized signal is provided to demodulator (DEMOD) 806, which provides demodulated data to decoder 808. Decoder 808, performs the inverse of the signal processing functions done at an AP, and provides decoded user data to data sink 810. The decoder further communicates with a controller 812, providing to the controller 812 overhead data. The controller 812 further communicates with other blocks comprising the AT 800 to provide proper control of the operation of the AT's 800, e.g., data encoding, power control. Controller 812 can comprise, e.g., a processor and a storage medium coupled to the processor and containing a set of instructions executable the processor.

The user data to be transmitted by the AT are provided by a data source 814 by direction of the controller 812 to an encoder 816. The encoder 816 is further provided with overhead data by the controller 812. The encoder 816 encodes the data and provides the encoded data to a modulator (MOD) 818. The data processing in the encoder 816 and the modulator 818 is carried out in accordance with RL generation as described in the text and figures above. The processed data is then provided to a transmitter within the front end 804. The transmitter modulates, filters, amplifies, and transmits the RL signal over the air, through antenna 802, on RL. AT 800 also includes a mode/detect unit 820 for determining the mode for transmissions.

Figure 9:
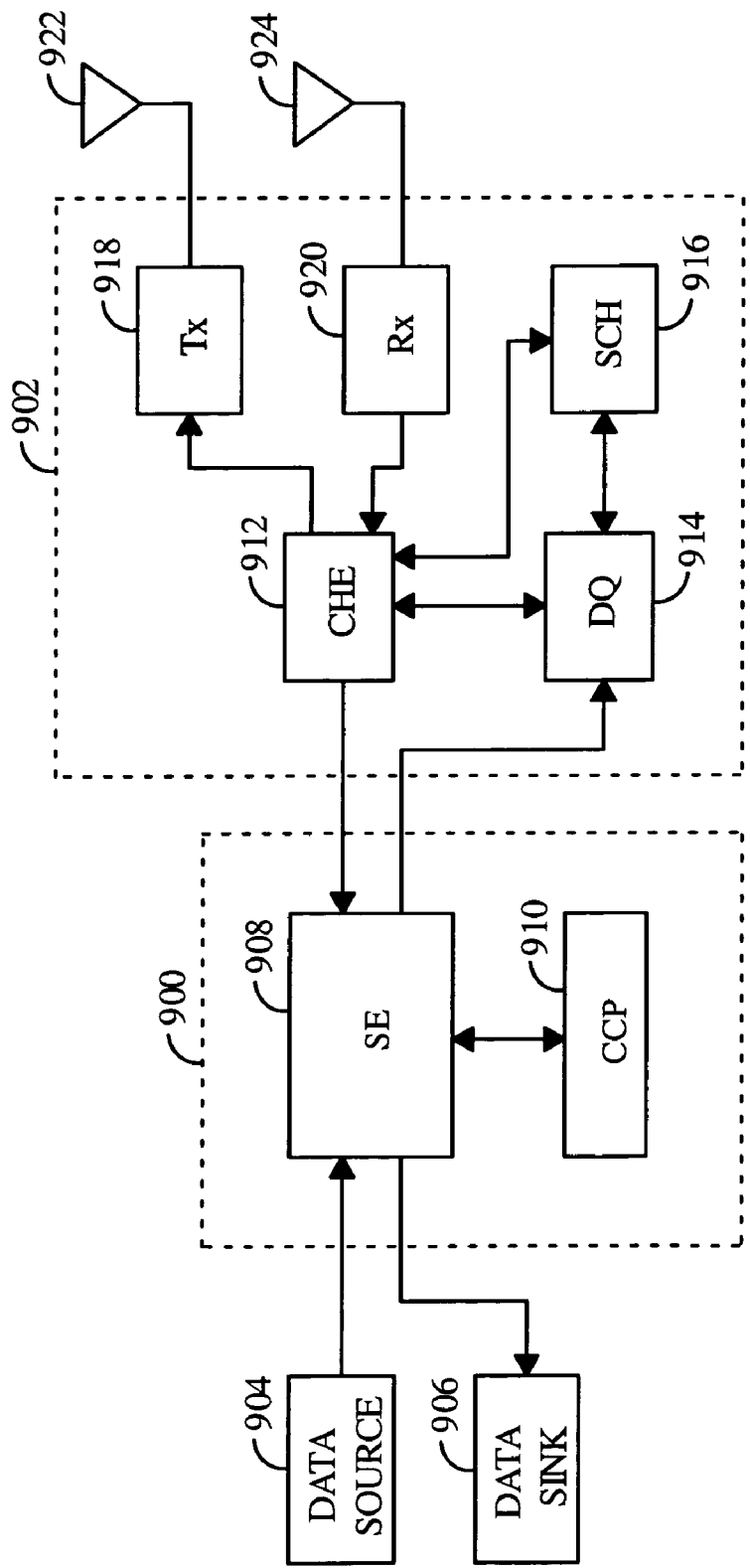
FIG. 9 illustrates a controller and an access terminal.

A controller 900 and an AP 902 is illustrated in FIG. 9. The user data generated by a data source 904, are provided via an interface unit, e.g., a packet network interface, PSTN, (not shown) to the controller 900. As discussed, the controller 900 interfaces with a plurality of APs, forming an access network. (Only one assess point 902 is shown in FIG. 9 for simplicity). The user data are provided to a plurality of selector elements (only one selector element 908 is shown in FIG. 9 for simplicity). One selector element is assigned to control the user data exchange between the data source 904 and data sink 906 and one or more base stations under the control of a call control processor 910. The call control processor 910 can comprise, e.g., a processor and a storage medium coupled to the processor and containing a set of instructions executable by the processor. As illustrated in FIG. 9, the selector element 908 provides the user data to a data queue 914, which contains the user data to be transmitted to ATs (not shown) served by the AP 902. In accordance with the control of a scheduler 916, the user data is provided by the data queue 914 to a channel element 912. The channel element 912 processes the user data in accordance with the IS-856 standard, and provides the processed data to a transmitter 918. The data is transmitted over the forward link through antenna 922.

The RL signals from ATs (not shown) are received at the antenna 924, and provided to a receiver 920. Receiver 920 filters, amplifies, demodulates, and digitizes the signal, and provides the digitized signal to the channel element 912. The channel element 912 performs the inverse of the signal processing functions done at an AT, and provides decoded data to selector element 908. Selector element 908 routes the user data to a data sink 906, and the overhead data to the call control processor 910.

In some embodiments, higher throughput may be achieved in RL transmissions by implementing an adaptive configuration in which the access network selects and assigns transmission modes for the ATs in a sector, on a subframe basis. In one embodiment, mode assignment by the access network provides for optional hybrid time slots, i.e., some of the modes that are assigned by the scheduler include hybrid CDM/TDM/OFDM transmission modes wherein OFDM refers to Orthogonal Frequency Division Multiplex.

In an embodiment of a communication system as illustrated in FIGS. 11A, 11B, 12A, 12B, 13A, and 13B below, a RL scheduler in the access network selects and assigns a transmission mode selected from three transmission modes, referred to as mode 1, mode 2, and mode 3. In mode 1, data is code-division-multiplexed for the entire slot, i.e., mode 1 is a 100% CDM mode. Mode 1 is the default mode, whereas mode 2 and mode 3 are the optional hybrid modes. Because only TDM data are delay tolerant, the hybrid slots are to be used only for delay tolerant traffic. Typically, hybrid slots are less likely to be used in applications such as Voice-over-Internet Protocol (VoIP), gaming, and video telephony. Hybrid slots are more likely to be used in applications such as FTP (file-transfer-protocol) upload, and e-mail type traffic. Regardless of the selected transmission mode, all of the ATs transmit the overhead channels, through which overhead data is transmitted, at the same time, using code-division-multiplexing.

In mode 2, data transmission is time-division-multiplexed within each time slot between a first half slot and a second half slot. In the first half slot in mode 2, data is code-division-multiplexed, while in the second half slot, data is either time-division-multiplexed or orthogonal-frequency-division-multiplexed. Mode 2 is thus 50% CDM and 50% TDM/OFDM within a slot. In mode 3, data is time division multiplexed within each time slot between a first fraction of the slot and a second fraction of the slot. The first fraction is a quarter (25%) time slot, and the second fraction is a three-quarters (75%) time slot. In the first fraction (quarter or 25%) of the slot in mode 3, data is code-division-multiplexed, while in the second fraction (three quarters or 75%) of the slot in mode 3, data is either time-division-multiplexed or orthogonal frequency division multiplexed. It should be understood that while the above-described modes are illustrated and discussed below, in other embodiments the hybrid modes may be characterized by time slot divisions in proportions other than 50%/50% or 25%/75%.

Regardless of the transmission mode that is selected, overhead data are transmitted using code-division-multiplexing. Regardless of the selected transmission mode, the same amount of overhead data is transmitted during a given time slot, and at the same power. Therefore, in the higher modes (e.g., in mode 2 which is 50% CDMA, or in mode 3 which is 25% CDMA), the gain of the overhead channels is increased, because the same amount of (overhead) data is transmitted during a shorter CDMA time interval. In one embodiment of the communication system, each of the ATs is configured to compensate for energy lost during transmission of the overhead data through the overhead channel(s), by increasing the gain of one or more of the overhead channels.

In one embodiment of the communication system, the ATs in soft or softer handoff may use the higher numbered modes. The loss in capacity caused by higher other cell interference, which in turn is caused by higher transmission power levels of the ATs during handoff, depends on the type of mode and the frequency of usage. At least one interlace in the RL operates in mode 1 at all times. The RL typically has three interlaces, i.e., continuous 4-slot intervals that repeat every 12-slots, one of which always operates in mode 1. The RL interlace offset i for a terminal is specified as:

$$i = (T - \text{FrameOffset})/4 \bmod 3, \quad (5)$$

where T represents the CDMA system time, in units of time slots, and $0 \leq i \leq 2$. With hybrid slots, the RAB (reverse activity bit) is set, for load control, based on the mode 1 slots and the even half (CDM) of mode 2 slots. For mode 3 slots, load control is accomplished by admission control, i.e., by controlling access of new communication requests to the network.

In one embodiment of the communication system, the Access channel is transmitted only during mode 1 slots, and provided with a 2-slot preamble. There may be up to 64 slots of CDM channel payload. Access probe start is permitted on any subframe. For access probe transmissions, ATs use the mode 1 interlace and the CDM portions of mode 2 and mode 3. This results in longer delays for access procedures. The delay depends on frame offset. In the best case scenario, the access delay is the same as CDM (mode 1 only). In the worst case scenario, access delay may be significantly higher, depending on access payload size and data rate used.

Figure 10:
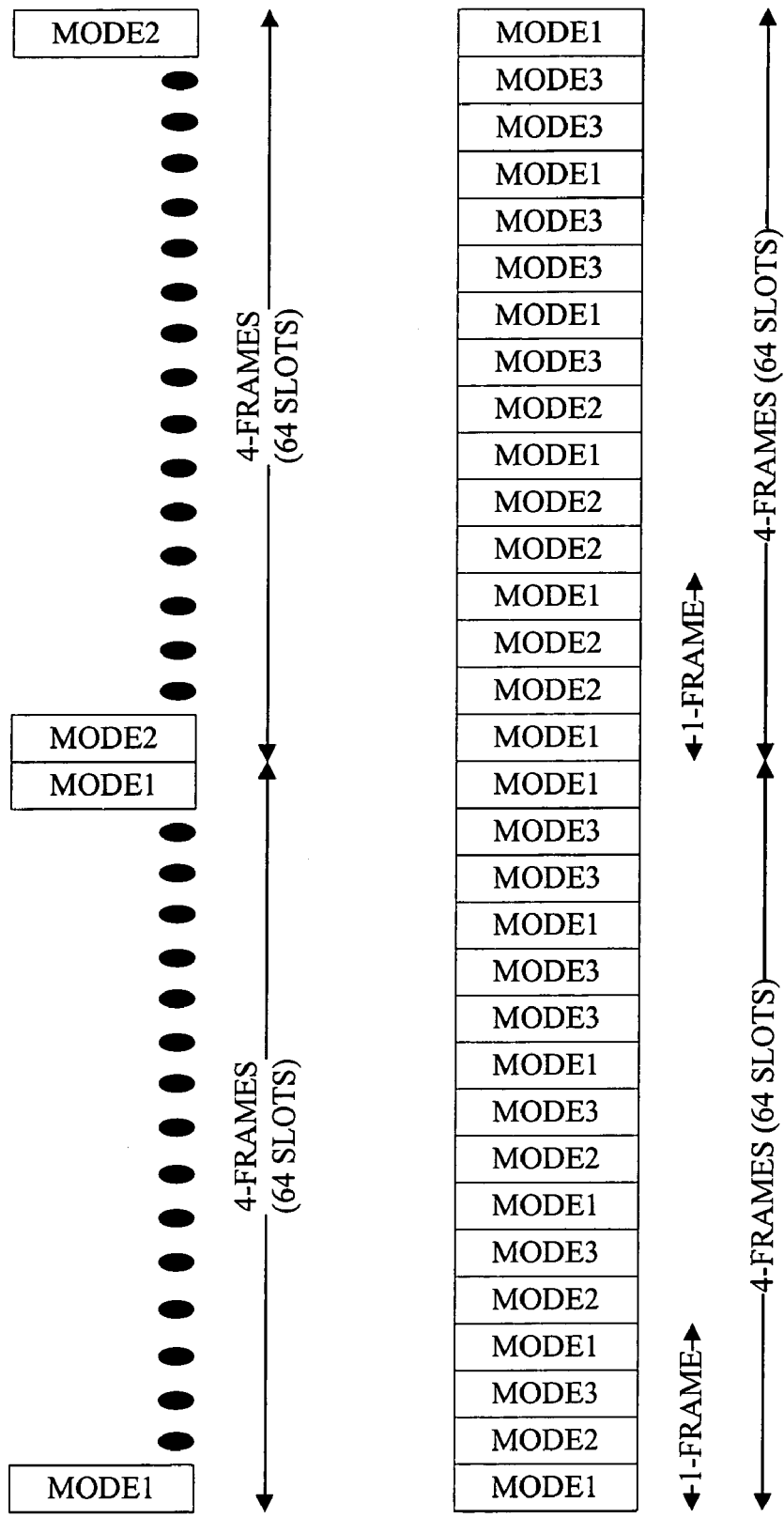
FIG. 10 is a transmission where mode settings may be changed per subframe.

FIG. 10 illustrates one example of mode settings, in an embodiment of the communication system in which the transmission mode is changed on a per-subframe basis. As explained earlier, mode selection and assignment occurs on a per subframe basis. In other words, a transmission mode, once assigned, may only be changed at the end of one subframe, or four time slots, although the modes need not necessarily be changed at the end of each subframe. An assignment, once made, may apply for several subframes. The assignment may be updated every so often, at the discretion of the access network. For example, the mode assignment may be updated each Control channel cycle, via a Synchronous Control Channel message.

Mode selection is based on the Request channels. The RL scheduler in the AN determines the mode to be used for a given subframe, depending on the applications of the data streams, and the resulting QoS requirements. The selection of the mode also depends on the total number of users in the sector, since the greater the number of users, the greater the bandwidth that is necessary for overhead channel transmissions. In one embodiment of the communication system, the RL scheduler assigns the same mode to all the ATs in the sector. To minimize intra-cell interference, transmission in the TDM/OFDM fraction of the hybrid slots is granted to ATs with the following attributes: high PA headroom, active set size, active cell size, and a FL SINR value that is greater than a threshold, which may be about 5 dB, for example. The RL MAC parameters are not changed for CDM transmission, whereas the TDM transmissions (during the hybrid slots) ignore all RL MAC parameters.

Figures 11A, 11B:
FIGS. 11A and 11B illustrate a RL waveform over a subframe, in a transmission mode that is CDM within an entire time slot ("mode 1").

FIGS. 11A and 11B illustrate a RL waveform over a subframe for mode 1, i.e., for a 100% CDM mode. In this mode, all ATs transmit the user data channel, as well as all the overhead channels, concurrently (i.e., by code-division-multiplexing). Each AT is distinguished from the others by the use of the long code mask and each channel for each AT is distinguished from the others by use of a different Walsh code. The CDM sub-packet or subframe, illustrated in FIGS. 11A and 11B, is made of four time slots, each slot having 2048 chips. FIG. 11A illustrates a mode 1 CDM subframe for a user for which no higher modes (modes 2 or 3) that include TDM subframes are scheduled. FIG. 11B illustrates a mode 1 CDM subframe for a user for which higher modes (i.e., hybrid modes 2 or 3) are scheduled. As seen in FIGS. 11A and 11B, the PR (packet ready) channel is optionally transmitted during CDM subframes, only if higher (hybrid) modes are scheduled in TDM subframes. The overhead channels in the mode 1 CDM subframe illustrated in FIG. 11A therefore do not include a PR channel, which is not transmitted during mode 1 CDM subframes if higher modes are not scheduled. The overhead channels in the mode 1 CDM subframe illustrated in FIG. 11B do include a PR channel, which is optionally transmitted if higher modes are scheduled. In FIG. 11A, the ACK channel is shown with dashed outlines, indicating that transmission of the ACK channel is optional in the mode 1 CDM subframe that is shown.

Figure 12A:
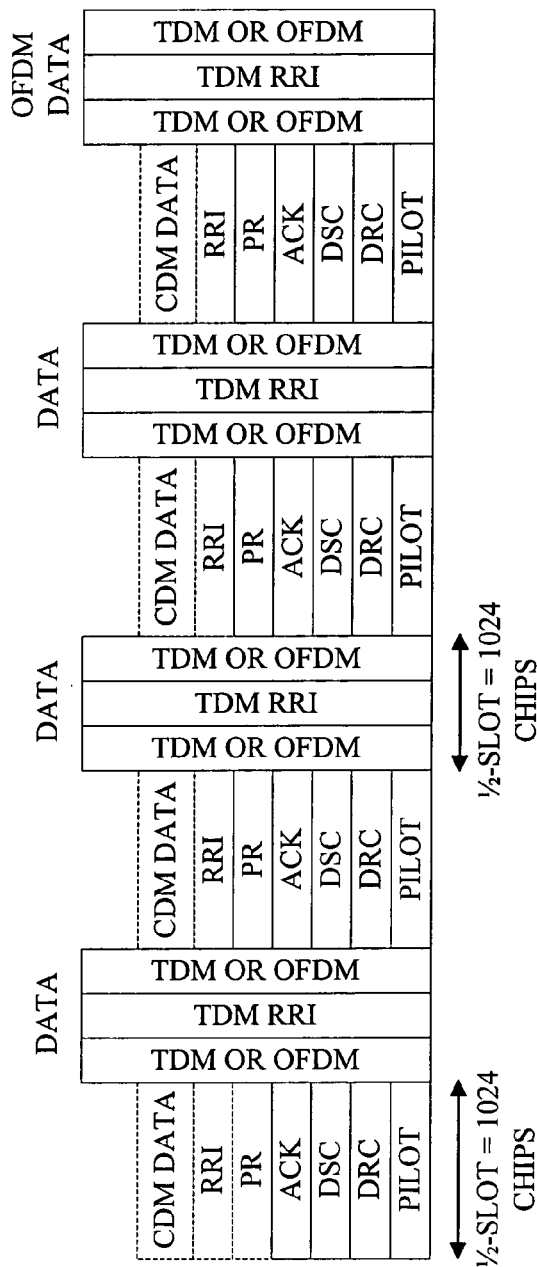
FIGS. 12A and 12B illustrate a RL waveform over a subframe, in a hybrid transmission mode wherein CDM and TDM/OFDM modes are time divisional multiplexed within a time slot ("mode 2").
Figure 12B:
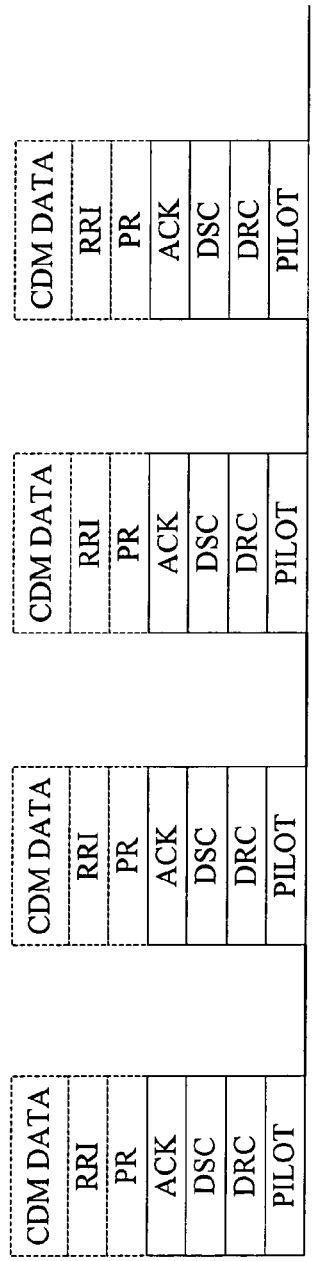

FIGS. 12A and 12B illustrate an RL waveform over a subframe for mode 2, i.e., for a mode that is a TDM of 50% CDM and 50% TDM/OFDM. As seen from the schematic diagram illustrated in FIG. 12A, in mode 2 the low-rate channels (including CDM data and the overhead channels) and the high-rate channels (TDM/OFDM data) are transmitted in disjoint time intervals, i.e., are time-division-multiplexed. The CDM fraction of a time slot, as well as the TDM/OFDM fraction of the time slot, each includes 1024 chips. FIGS. 12A and 12B illustrate the TDM packets (50% of each packet being a CDM time interval, and 50% of each packet being a TDM/OFDM time interval) in more detail. FIG. 12A illustrates a TDM packet for an active TDM user, and FIG. 12B illustrates a TDM packet for an idle TDM user. As seen from FIGS. 12A and 12B, the PR channel is optionally transmitted during the CDM fraction of the time slots. The TDM packet for an active user, as illustrated in FIG. 12A, shows user data being transmitted during the TDM/OFDM interval within the time slot, whereas the TDM packet for an idle user, as illustrated in FIG. 12B, shows no user data being transmitted during the TDM/OFDM interval within the time slot. The CDM data channel, the RRI channel, and the PR channel, all of which are shown as boxes with dashed outlines in FIGS. 12A and 12B, are optional transmissions in mode 2.

During the overhead intervals in mode 2, all users transmit their overhead channels, using code division multiplexing. The overhead channels are transmitted over 1024 chips/slot, each channel covered with a different code. All delay-sensitive packets are transmitted during the overhead interval, while delay-tolerant traffic is transmitted during the TDM/OFDM fraction. During traffic intervals (i.e., the TDM/OFDM fractions of a time slot), each sector schedules transmission by a single user.

In terminals that use only CDM time slots, all channels are gated OFF during even half slots (count starting at zero), when operating in mode 2. A modified packet structure is provided, to ensure some coding gain with reduced packet size. In terminals using only CDM time slots, a 2-slot RRI is provided in the overhead channels in the CDM time slot, for CDM data transmission. The gain and length (measured as the number of time slots) of the DRC channel and the DSC channel are adjusted, in order to minimize performance impact during Mode 2 slots. Also, the RRI channel power is increased in the traffic channels in the CDM slot, to compensate for shorter RRI. The payload may be reduced, or the TRAFFIC TO PILOT increased, depending on sector loading. The payload reduction or TRAFFIC TO PILOT increase is indicated by the FRAB (Filtered-Reverse-Activity-Bit).

For mode 1 to mode 2 CDM traffic, RRI channel power is increased, along with the TRAFFIC TO PILOT< if FRAB (Filtered Reverse Activity Bit) is low. The RRI channel power is decreased, along with the TRAFFIC TO PILOT, if FRAB is high. The reason is that the RRI to Pilot gain is higher if FRAB is low. Similar rules apply for mode 2 to mode 3, and mode 1 to mode 3. For legacy mode operation (mode 1 only), loss may be limited by restricting the number of mode 2 and mode 3 slots.

Examples of TDM Packet parameters for mode 2 are provided in Table 4. As seen from Table 4, the RL data rates range from 76.8 kpbs to 1843.2 kbps. The payload sized range from 512 bits to 12288 bits. The modulation types used include QPSK, 8-PSK, and 16-QAM. The number of RRI chips per slot decreases as a function of the Traffic channel gain.

In terminals employing TDM transmissions (which for mode 2 occur in the hybrid slots only), the traffic channels have a data channel structure identical to that used during CDM slots. The Data channel and the Auxiliary pilot channel may be code division multiplexed as an alternative, in order to provide higher flexibility in allocating power. The advantage is that such an implementation is easier, compared to time division multiplexed Data and RRI channels. The disadvantage is the higher PAR (peak-to-average power ratio). The terminals transmit user data through the traffic channels in a way as to achieve the maximum achievable data rate. The maximum achievable rate is based on the PA (power amplifier) headroom, and the amount of data in the buffer. The maximum achievable rate may be indicated by the AN via the Scheduling Grant message, providing a mechanism for soft power control.

FIGS. 13A-13B illustrate a RL waveform over a subframe for mode 3, which is a TDM of 25% CDM and 75% TDM/OFDM. FIG. 13A illustrates a TDM packet for an active TDM user, whereas FIG. 13B illustrates a TDM packet for an idle TDM user. As seen from both FIGS. 13A and 13B, in mode 3 no CDM data is transmitted during the CDM portion (25%) of the slot, and only the overhead channels (PR, ACK, DSC, DRC, and Pilot channels) are transmitted. In other words, for ATs using only CDM slots, no user data transmission occurs. This is because only 25% of the slot is allocated to the CDM interval, so that not enough energy is available in mode 3 for transmission of CDM data during the CDM interval. Accordingly, mode 3 should be used only if there is no need or desire to transmit CDM data.

Also not transmitted in the CDM interval in mode 3 is the RRI channel, which is optionally transmitted during the CDM interval in mode 2. In mode 3, the optional transmissions during the CDM interval are transmissions of the PR channel and the ACK channel. The gain and length of the overhead channels in mode 3 may be adjusted to minimize performance impact relative to the mode 2 slots. Energy lost in the overhead channels may be compensated for by increasing the overhead channel gain. The traffic channels, for terminals using TDM/OFDM transmission, are identical to the mode 2 traffic channels, however the traffic channels in mode 3 may support higher data rates compared to mode 2 (because 75% of the slot is allocated to traffic data, compared to 50% in mode 2). A major advantage of mode 3 transmission is that a higher peak data rate may be supported, namely up to 3.1 Mbps.

One example of TDM Packet parameters for mode 3 are provided in Table 5. As seen from Table 5, the RL data rates range from 76.8 kpbs to 3072.0 kbps, representing a significant increase in peak data rate. The payload sized range from 512 bits to 20480 bits. The modulation types used include QPSK, 8-PSK, and 16-QAM. The number of RRI chips per slot decreases as a function of the Traffic channel gain, as in mode 2.

TABLE 4

| Data Rate (kbps) | Data (dB) | RRI Slot | Data Bits | Mod Type |
|---|---|---|---|---|
| 76.8 | 14.5 | 384 | 512 | QPSK |
| 153.6 | 16.6 | 192 | 1024 | QPSK |
| 230.4 | 18.4 | 128 | 1536 | QPSK |
| 307.2 | 19.3 | 96 | 2048 | QPSK |
| 460.8 | 21.0 | 64 | 3072 | QPSK |
| 614.4 | 22.5 | 48 | 4096 | QPSK |
| 921.6 | 25.8 | 32 | 6144 | 8-PSK |
| 1228.8 | 27.6 | 16 | 8192 | 8-PSK |
| 1843.2 | 32.0 | 16 | 12288 | 16-QAM |

TABLE 5

| Data Rate (kbps) | Data Gain (dB) | RRI chips/Slot | Data Bits | Mod Type |
|---|---|---|---|---|
| 76.8 | | 384 | 512 | QPSK |
| 153.6 | | 192 | 1024 | QPSK |
| 230.4 | | 128 | 1536 | QPSK |
| 307.2 | | 96 | 2048 | QPSK |
| 460.8 | | 64 | 3072 | QPSK |
| 614.4 | | 48 | 4096 | QPSK |
| 921.6 | | 32 | 6144 | 8-PSK |
| 1228.8 | | 16 | 8192 | 8-PSK |
| 1843.2 | | 16 | 12288 | 16-QAM |
| 2457.6 | | 16 | 16384 | 16-QAM |
| 3072.0 | | 16 | 20480 | 16-QAM |

In the above-described embodiments of the communication system, in which optional hybrid slots are provided, the AN is configured to receive from all the ATs in a sector a request to transmit data in a time slot. Upon receiving a request message from each AT, the AN assigns to each AT in the sector a transmission mode for transmitting data, on a per subframe basis. As described above, mode selection may be sector based, i.e., the same mode may be assigned to all the ATs in a sector. The assigned mode or mode pattern may be announced a priori to all the ATs in the sector. The AN (or an RL scheduler within the AN) then schedules a transmission, i.e., decides which AT is allowed to transmit data during the requested time slot. The AN transmits to each AT a grant message that indicates the assigned transmission mode, as well as designating the AT to which permission to transmit has been granted.

In embodiments of the communication system in which hybrid slots are optionally scheduled, the power of the RL overhead channels and the RL traffic channels are controlled together for mode 1 slots. For mode 2 and mode 3 slots, the power for the overhead channels and the traffic channels is controlled separately. Overhead channel power control is controlled using an inner loop and an outer loop, as described earlier, and is based on a fixed Gain between pilot and overhead channels. The inner loop is an OR of down across cells. For the outer loop, the setpoint is based on the target DRC Erasure Rate at the BTS (cell) with the best RL CDM-Traffic PER (packet error rate), if available. The PC (power control) setpoint is decreased, if the DRC erasure rate is <about 25% AND the CDM-data packet decoded successfully. The PC setpoint is increased, if the DRC erasure rate is > about 25% OR the Packet (CDM-data) is not decoded successfully. It should be understood, of course, that the percentage range of 25% is merely provided as an example, and other percentage values for the DRC erasure rate may also be used. The DRC erasure rate may be updated every frame. Terminals using the CDM mode of transmission may switch between mode 1, mode 2 and mode 3 slots. By making appropriate adjustments to the TRAFFIC TO PILOT, the same PC setpoint may be maintained across transitions.

In one embodiment, allocation of resources to the MAC flows in each AT in the sector are also controlled from the AN, in addition to mode assignment and user scheduling. A resource allocation for a flow may contain, for example, the values of TRAFFIC TO PILOT, TRAFFIC TO PILOTmax, and TRAFFIC TO PILOT hold for that flow in that AT, where TRAFFIC TO PILOT (traffic-to-pilot power ratio) is the ratio between the transmit power of the traffic channel and the transmit power of the pilot channel, for the AT. Such scheduled resource allocation control is part of IS-856-A, and provides for rapid and efficient usage of resources, as well as ease of design for QoS purposes. In particular, by providing for control of AT TRAFFIC TO PILOT allocation from the AN, such a scheduled resource allocation control allows for a rapid allocation or re-allocation of all sector resources to each active flow.

In this embodiment, the request message from the AT contains, in addition to a request to transmit data in a time slot, an allocation request for allocating a resource to the MAC flows within the AT. Each allocation request packet contains information about each RL MAC flow at the AT.

Figure 14:
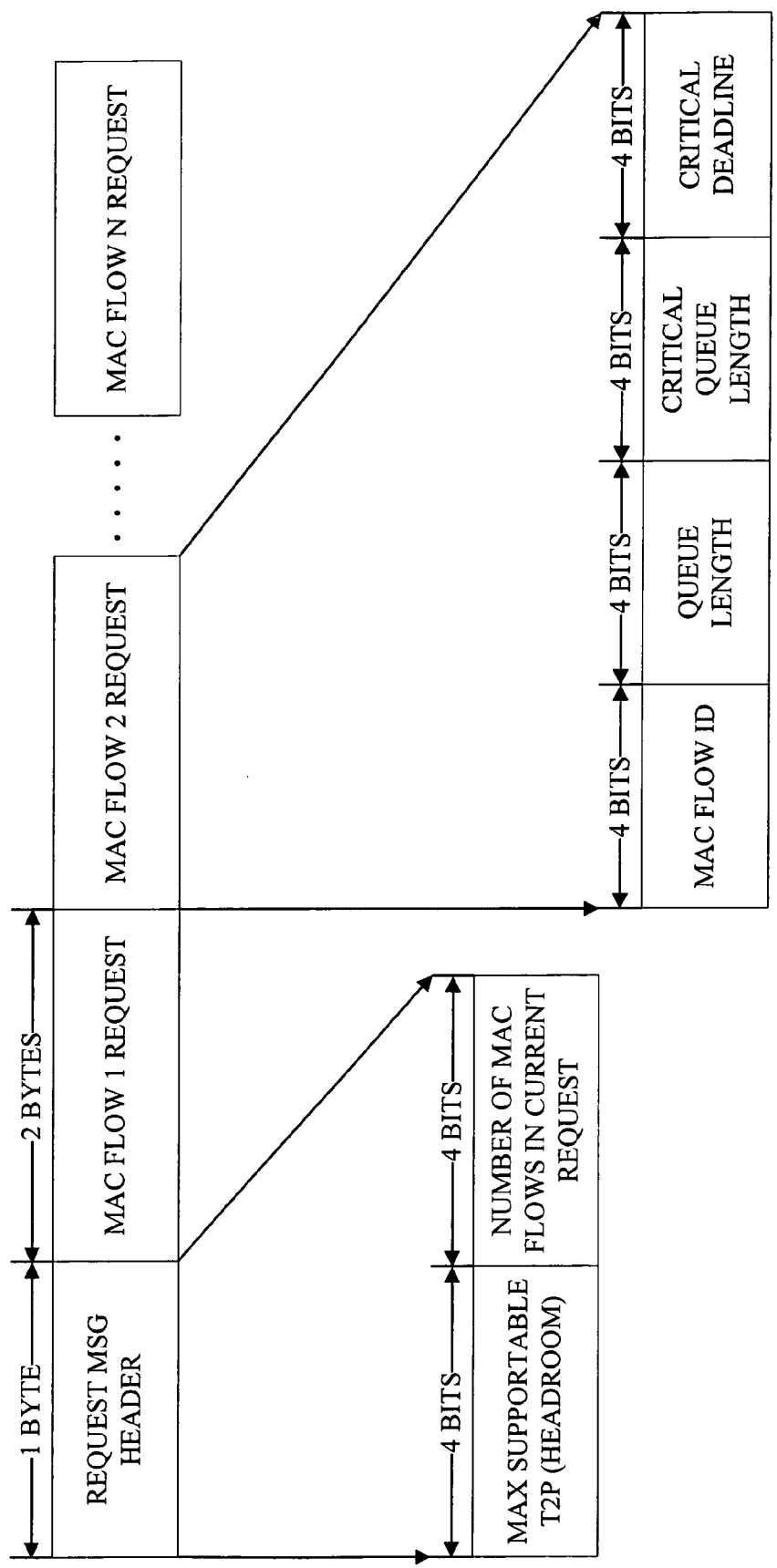
FIG. 14 illustrates a request packet format, in an embodiment that allows for scheduled resource allocation control for MAC flows in the ATs.

FIG. 14 illustrates a request packet format, in an embodiment which provides for scheduled resource allocation control for MAC flows in the AT. The first byte of the Request packet contains a Request message header. The first four bits of the Request message header provides information about the maximum supportable TRAFFIC TO PILOT, i.e., headroom. The next four bits of the Request message header provides the number N of MAC flows in the current Request packet. Request for each MAC flow (MAC flow 1, MAC flow 2, . . . ) then follows, one after the other consecutively, Each MAC flow request occupies 2 bytes, of which the first 4 bits provide a MAC flow ID for the MAC flow request, the next 4 bits provide a queue length, the next 4 bits provide a critical queue length, and the last 4 bits provide a critical deadline.

The AT sends out the Request packet, if and only if there is traffic channel data to send out, and either of the following conditions are met:
1) a minimum number $N_{min}$ of bits have been sent since the last Request packet, or
2) a predetermined time interval $T_{max}$ has lapsed since the last Request packet was sent, i.e., a predetermined time interval has gone by without sending any Request packet.

Condition 1) seeks to ensure that the Request packets are not sent out too often, i.e. that enough data has flowed since the last Request. Condition 2) seeks to ensure that the Request packets are not sent out too seldom, i.e., that a Request packet be sent out at least once every $T_{max}$. The AT piggybacks the Request packets on traffic channel data. The Request may be power-boosted for rapid transmission.

In one embodiment, $N_{min}$ in condition 1) above is given by:

$$N_{min}=(1/\text{ReqRatio}-1)*\text{RequestPktSize}, \quad (6)$$

where ReqRatio represents the desired ratio of request bits to traffic bits, and the magnitude of RequestPktSize varies with the number of flows in the request. ReqRatio is chosen to make sure that the overhead induced by the Request message is not too large, i.e., that the bulk of what is transmitted consists of traffic bits, not request bits.

In addition to sending out a Request packet containing a resource allocation request, the request mechanism from the AT includes transmission from the AT to the AN of RL channel quality information. The AT generates the RL channel quality information by determining opportunity levels, as described earlier. As described in detail in paragraphs 96-99 above, the opportunity levels are determined by requiring that the ratio between the energy of a pilot signal filtered for the past k slots, and the instantaneous energy of the pilot signal (i.e., the energy of the pilot signal during an n-th time slot), be above a threshold value.

In one embodiment, the opportunity levels are defined as listed in Table 3 above, with thresholds as follows:
for Opportunity Level 0 ("no data") Tx_Pilot(n), is more than about 3 dB above Filt_Tx_Pilot(n);
for Opportunity Level 1 ("data available"), Tx_Pilot(n) is within about 3 dB of Filt_Tx_Pilot(n);
for Opportunity Level 2 ("data available, channel condition 'GOOD'") Tx_Pilot(n) more than about 3 dB below Filt_Tx_Pilot(n);
for Opportunity Level 3("data available, channel condition 'VERY GOOD'") Tx_Pilot(n) is more than about 6 dB below Filt_Tx_Pilot(n)

It should be understood that the threshold levels provided above (3 dB and 6 dB) are example values that are provided for illustrative purposes, and other embodiments of the communication system described above may have different threshold levels. The number of opportunity levels, which in the example described above is three, may also be different in other embodiments of the communication system described in this patent.

In one embodiment in which hybrid modes are provided, the RL channel quality information may be transmitted through an R-CQICH (reverse Channel Quality Indicator Channel) channel. In this embodiment, the RL channel quality information is transmitted from the AT to the AN only when hybrid slots are to be scheduled by the AN. The opportunity levels are transmitted on the R-CQICH channel using QPSK modulation.

The grant mechanism from the AN, in response to receipt of the MAC flow Request message and the opportunity levels transmitted over the R-CQICH (only when hybrid modes are scheduled), includes: a) assigning a transmission mode (as described above); 2) generating and sending a resource allocation Grant message in response to receipt of the Request packet, and 3) generating and sending individual user grant for the TDM/OFDM fraction of the hybrid slots (for TDM traffic).

When scheduling a resource allocation Grant message for CDM traffic, the grant message is transmitted on the FL Traffic channel, from the serving sector to its ATs. The timing and content of the Grant message is determined by the AN scheduler. A Grant message contains "grants" for one or more ATs, and a grant to an individual AT contains resource allocation for one or more MAC flows within the AT. A resource allocation for a flow contains the values of TRAFFIC TO PILOT, TRAFFIC TO PILOTmax, and TRAFFIC TO PILOThold for that flow. TRAFFIC TO PILOThold an be used to fix a TRAFFIC TO PILOT allocation until a later Grant. The Grant message contains new state variables and parameter values for specific flows. Upon receiving the Grant message, the AT overwrites its RLMAC state variables and parameters with the respective received values for each appropriate flow. The Grant message may be sent either via a multi-user packet or the Control channel. When embedded in a multi-user packet, a reserved MAC_ID is used in the MAC header of the multi-user packet, to refer to the payload associated with the Grant message.

Figure 15:
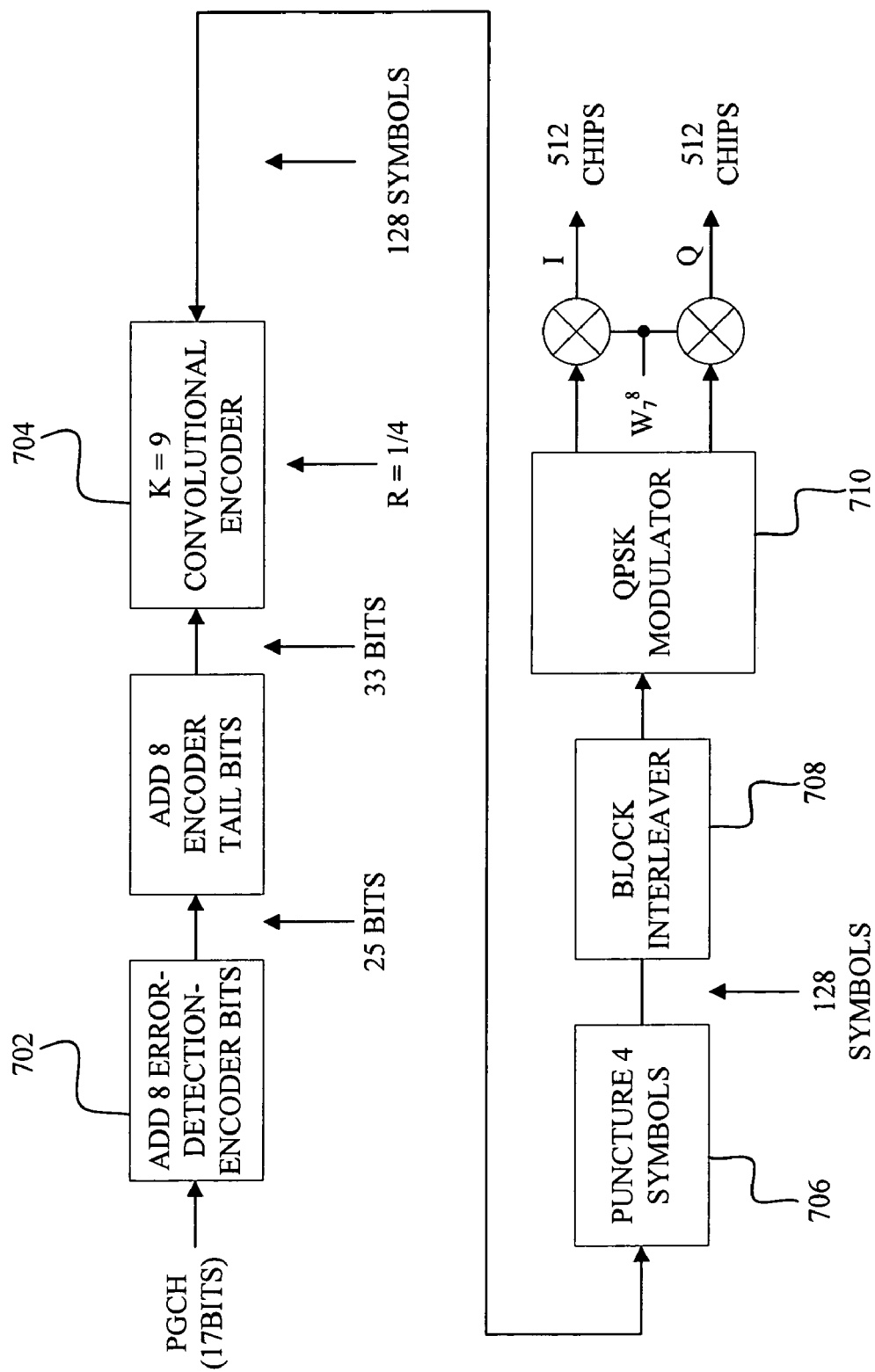
FIG. 15 illustrates the structure of a Packet Grant (PG) channel.

The user grants for TDM/OFDM fractions of hybrid slots, generated in response to receipt of the opportunity levels, are transmitted via the FL PGCH (Packet Grant channel). The PGCH for TDM traffic is repeated over 2 slots for improved reliability. FIG. 15 illustrates the structure of a PGCH, showing the coding, modulation and spreading for the PGCH. The error-detection encoder 702 may be a CRC encoder. The convolutional encoder 704 has a constraint length (K) of 9. In the illustrated embodiment, a convolutional code rate of ¼ is used. A total of 4 symbols out of the convolutional encoder 704 are punctured, in block 706. The symbols out of the puncturing operation are block interleaved, by the block interleaver 708. A total of 128 symbols out of the block interleaver 708 are modulated using QPSK modulator 710, then divided into I stream and Q stream, and spread by a $W_7^8$ code. A total of 512 chips out of the spreading operation are mapped into the 512 MAC chips in the slot. In an alternate approach, the PGCH is communicated over a quadrature branch of the RPC channel, using ternary mode signed on/off keying, as explained above in conjunction with FIG. 3.

It will be appreciated that although the flowchart diagrams are drawn in sequential order for comprehension, certain steps may be carried out in parallel in an actual implementation.

It will be appreciated that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

It will be further appreciated that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executable by a processor, or in a combination of the two. A software module may reside in RAM memory, flash memory, ROM memory, EPROM memory, EEPROM memory, registers, hard disk, a removable disk, a CD-ROM, or any other form of storage medium known in the art. One example of storage medium is coupled to the processor such the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications will be readily apparent to those skilled in the art, and the generic principles defined herein may be applied without departing from the scope of the embodiments. Thus, the present invention is not intended to be limited to the embodiments shown herein but is to be accorded the widest scope consistent with the principles and novel features disclosed herein.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

For the convenience of the reader, an alphabetical list of acronyms is provided as follows:

LIST OF ACRONYMS

AP Access Point
ACK Acknowledgement

ARQ Automatic Re-transmission reQuest
ASIC Application Specific Integrated Circuit
BPSK Binary Phase-Shift Keying
CDMA Code-Division-Multiple-Access
CRC Cyclic Redundancy Check
DRC Channel Data Request Message
DRC Data Request Channel
DSP Digital Signal Processor
EcpINt Energy-Per-Chip-To-Noise-Plus-Interference Ratio
FDMA Frequency Division Multiple-Access
FPGA Field-Programmable Gate Array
FRAB Filtered Reverse Activity Bit
FTP File Transfer Protocol
GOS Grade Of Service
HDR High Data Rate
LAC Link Access Control
MAC Medium Access Control Channel
MOD Modulator
MSB Most Significant Bit
NACK Non-serving Access Point
OFDM Orthogonal-Frequency-Division-Multiplexing
OL Opportunity Level
OSI Open Systems Interconnection
PC Pilot Channel
PER Packet Error Rate
PGCH Packet Grant Channel
PN Pseudo Noise
PR Packet Ready
PSTN Public Switched Telephone Network
QoS Quality Of Service
QPSK Quadrature-Phase Shift Keying
RA Reverse Activity
RLP Radio Link Protocol
ROT Rise Over Thermal
RPC Reverse Power Control Channel
RRI Reverse Rate Indication
SD Scheduling Decision
SINR Signal-To-Interference-And-Noise-Ratio
TDMA Time Division Multiple-Access
3GPP 3rd Generation Partnership Project

What is claimed is:

1. A communication system comprising:
an access network configured to select a multiple access transmission mode from a plurality of multiple access transmission modes, broadcast a signal indicating the selected multiple access transmission mode to at least one of a plurality of access terminals, and to schedule a transmission of data in one of a plurality of transmission time slots within a frame, from one of the access terminals in the selected multiple access transmission mode;
wherein the plurality of multiple access transmission modes comprises a hybrid multiple access transmission mode in which data is code-division-multiplexed during a portion of a single transmission time slot, and data is either time-division-multiplexed or orthogonal-frequency-division-multiplexed during a remaining portion of the single transmission time slot,
wherein the data comprises user data and overhead data,
wherein transmission of the user data is prohibited during said portion of said single transmission time slot in which the data is code-division-multiplexed,
wherein the data comprises user data to be transmitted through a traffic channel and overhead data to be transmitted through an overhead channel, and
wherein the plurality of transmission modes comprises transmission modes that allow for a transmission of overhead data through the overhead channel only during a portion of a single transmission time slot in which code-division-multiplexing is implemented.

2. The communication system of claim 1, wherein the plurality of multiple access transmission modes comprise:
a first multiple access transmission mode in which data is code-division-multiplexed during the transmission time slot; and
a second multiple access transmission mode in which data is code-division-multiplexed during a first portion of the transmission time slot, and data is either time-division-multiplexed or orthogonal-frequency-division-multiplexed during a second portion of the transmission time slot.

3. The communication system of claim 1, wherein the plurality of multiple access transmission modes comprise:
a first transmission mode in which data is code-division-multiplexed during the transmission time slot;
a second transmission mode in which data is code-division-multiplexed during a first half of the transmission time slot, and data is either time-division-multiplexed or orthogonal-frequency-division-multiplexed during a second half of the transmission time slot; and
a third transmission mode in which data is code-division-multiplexed during a first quarter of the transmission time slot and data is either time-division-multiplexed or orthogonal-frequency-division-multiplexed during the remaining three quarters of the transmission time slot.

4. The communication system of claim 3,
wherein transmission of user data is prohibited during said first quarter of said transmission time slot in which the data is code-division-multiplexed.

5. The communication system of claim 1, wherein the access network is further configured to update the selected multiple access transmission mode after a number of transmission time slots.

6. The communication system of claim 5, wherein the transmission time slot comprises about 1.66 milliseconds, and the number comprises four.

7. The communication system of claim 1,
wherein each of the access terminals is configured to transmit to the access network a request to transmit data in the transmission time slot, and
wherein the access network is configured to schedule the transmission in response to the request to transmit data from each of the access terminals.

8. The communication system of claim 7, wherein each of the access terminals is further configured to determine an opportunity level for the transmission time slot, and to transmit the opportunity level to the access network.

9. The communication system of claim 8,
wherein each of the access terminals is connected to the access network through a reverse link; and
wherein each of the access terminals is configured to determine the opportunity level in accordance with an instantaneous quality metric of a channel in the reverse link in the transmission time slot, an average quality metric of the channel, and an impatience function.

10. The communication system of claim 9,
wherein each access terminal is configured to transmit the opportunity level to the access network when the selected multiple access transmission mode is a multiple access transmission mode in which data is code-division-multiplexed during a first portion of the transmission time slot, and data is either time-division-multiplexed or orthogonal-frequency-division-multiplexed during a second portion of the transmission time slot.

11. The communication system of claim 7,
wherein each of the access terminals is further configured to send to the access network an allocation request that asks for a resource to be allocated to a data flow within the access terminal during the transmission time slot.

12. The communication system of claim 11, wherein the access network is further configured to allocate the resource to the data flow within one of the access terminals during the transmission time slot, in response to the allocation request from said one of the access terminals.

13. The communication system of claim 12, wherein the access network is further configured to transmit to said one of the access terminals an allocation message indicating the allocation of the resource.

14. The communication system of claim 11,
wherein each of the access terminals is configured to send the allocation request if at least two of the following are satisfied:
data is available for transmission, a predetermined amount of data has already been transmitted since a previous allocation request was sent from the access terminal, and a predetermined time interval has elapsed since the previous allocation request.

15. The communication system of claim 12,
wherein each of the access terminals is connected to the access network through a reverse link, and
wherein the resource comprises a ratio between a transmit power of a traffic channel in the reverse link, and a transmit power of a pilot channel in the reverse link.

16. The communication system of claim 13,
wherein the data flow within said one of the access terminals is characterized by a state variable and a parameter, and
wherein the allocation message indicates a new value for the state variable and a new value for the parameter.

17. The communication system of claim 16,
wherein said one of the access terminals is configured to replace the state variable and the parameter of the data flow with the new values, in response to the allocation message.

18. The communication system of claim 13, wherein the allocation message further indicates a maximum rate of data transmission for said one of the access terminals.

19. The communication system of claim 1, wherein each of the access terminals is configured to compensate for an energy loss during the transmission of the overhead data, by increasing a gain of the overhead channel.

20. An access network comprising a scheduler configured to select a multiple access transmission mode from a plurality of multiple access transmission modes, broadcast a signal indicating the selected multiple access transmission mode to at least one of a plurality of access terminals, and to schedule a transmission of data in one of a plurality of transmission time slots within a frame, from one of the access terminals in the selected multiple access transmission mode;
wherein the plurality of multiple access transmission modes comprises a hybrid multiple access transmission mode in which data is code-division-multiplexed during a portion of a single transmission time slot, and data is either time-division-multiplexed or orthogonal-frequency-division-multiplexed during a remaining portion of the single transmission time slot,
wherein the data comprises user data and overhead data,
wherein transmission of the user data is prohibited during said portion of said single transmission time slot in which the data is code-division-multiplexed,
wherein the data comprises user data to be transmitted through a traffic channel and overhead data to be transmitted through an overhead channel, and
wherein the plurality of transmission modes comprises transmission modes that allow for a transmission of overhead data through the overhead channel only during a portion of a single transmission time slot in which code-division-multiplexing is implemented.

21. The access network of claim 20, wherein the plurality of multiple access transmission modes comprise:
a first multiple access transmission mode in which data is code-division-multiplexed during the transmission time slot; and
a second multiple access transmission mode in which data is code-division-multiplexed during a first portion of the transmission time slot, and the data is either time-division-multiplexed or orthogonal-frequency-division-multiplexed during a second portion of the transmission time slot.

22. An access terminal operable to transmit data in each of a plurality of multiple access transmission modes, the access terminal comprising a mode select unit, a receiver and a transmitter,
wherein the access terminal is configured to receive a signal indicating a selection of one of the plurality of multiple access transmission modes for one of a plurality of transmission time slots within a frame, and to transmit data in the selected multiple access transmission mode during the transmission time slot;
wherein the plurality of multiple access transmission modes comprises a hybrid multiple access transmission mode in which data is code-division-multiplexed during a portion of a single transmission time slot, and data is either time-division-multiplexed or orthogonal-frequency-division-multiplexed during a remaining portion of the single transmission time slot,
wherein the data comprises user data and overhead data,
wherein transmission of the user data is prohibited during said portion of said single transmission time slot in which the data is code-division-multiplexed,
wherein the data comprises user data to be transmitted through a traffic channel and overhead data to be transmitted through an overhead channel, and
wherein the plurality of transmission modes comprises transmission modes that allow for a transmission of overhead data through the overhead channel only during a portion of a single transmission time slot in which code-division-multiplexing is implemented.

23. The access terminal of claim 22, wherein the plurality of multiple access transmission modes comprise:
a first multiple access transmission mode in which data is code-division-multiplexed during the transmission time slot; and
a second multiple access transmission mode in which data is code-division-multiplexed during a first portion of the transmission time slot, and data is either time-division-multiplexed or orthogonal-frequency-division-multiplexed during a second portion of the transmission time slot.

24. The access terminal of claim 22, wherein the access terminal is further configured to send to an access network a request to transmit data in a transmission time slot, and receive from the access network a permission to transmit data in the transmission time slot in accordance with the request.

25. The access terminal of claim 22, wherein the access terminal is further configured to receive the signal from an access network.

26. A method of transmitting data, comprising:
- selecting a multiple access transmission mode from a plurality of multiple access transmission modes;
- broadcasting a signal indicating the selected multiple access transmission mode to at least one of a plurality of access terminals; and
- scheduling a transmission of data in one of a plurality of transmission time slots within a frame, from one of the plurality of access terminals, in the selected multiple access transmission mode;
- wherein the plurality of multiple access transmission modes comprises a hybrid multiple access transmission mode in which data is code-division-multiplexed during a portion of a single transmission time slot, and data is either time-division-multiplexed or orthogonal-frequency-division-multiplexed during a remaining portion of the single transmission time slot,
- wherein the data comprises user data and overhead data,
- wherein transmission of the user data is prohibited during said portion of said single transmission time slot in which the data is code-division-multiplexed,
- wherein the data comprises user data to be transmitted through a traffic channel and overhead data to be transmitted through an overhead channel, and
- wherein the plurality of transmission modes comprises transmission modes that allow for a transmission of overhead data through the overhead channel only during a portion of a single transmission time slot in which code-division-multiplexing is implemented.

27. The method of claim 26, wherein the plurality of multiple access transmission modes comprise:
- a first multiple access transmission mode in which the data is code-division-multiplexed during the transmission time slot; and
- a second multiple access transmission mode in which the data is code-division-multiplexed during a first portion of the transmission time slot, and the data is either time-division-multiplexed or orthogonal-frequency-division-multiplexed during a second portion of the transmission time slot.

28. A method of transmitting data, comprising:
- receiving a signal indicative of a multiple access transmission mode selected from a plurality of multiple access transmission modes; and
- transmitting data in the selected multiple access transmission mode during one of a plurality of transmission time slots within a frame;
- wherein the plurality of multiple access transmission modes comprises a hybrid multiple access transmission mode in which data is code-division-multiplexed during a portion of a single transmission time slot, and data is either time-division-multiplexed or orthogonal-frequency-division-multiplexed during a remaining portion of the single transmission time slot,
- wherein the data comprises user data and overhead data,
- wherein transmission of the user data is prohibited during said portion of said single transmission time slot in which the data is code-division-multiplexed,
- wherein the data comprises user data to be transmitted through a traffic channel and overhead data to be transmitted through an overhead channel, and
- wherein the plurality of transmission modes comprises transmission modes that allow for a transmission of overhead data through the overhead channel only during a portion of a single transmission time slot in which code-division-multiplexing is implemented.

29. The method of claim 28, wherein the plurality of multiple access transmission modes comprise:
- a first multiple access transmission mode in which the data is code-division-multiplexed during the transmission time slot; and
- a second multiple access transmission mode in which the data is code-division-multiplexed during a first portion of the transmission time slot, and the data is either time-division-multiplexed or orthogonal-frequency-division-multiplexed during a second portion of the transmission time slot.

30. The method of claim 28, wherein receiving a signal comprises receiving a signal from an access network.

31. The method of claim 28, further comprising transmitting a request to transmit data in the transmission time slot to an access network, and receiving from the access network a permission to transmit data in the transmission time slot in accordance with the request.

32. The method of claim 31, wherein transmitting the request comprises determining at each access terminal an opportunity level for the transmission time slot, and transmitting the opportunity level.

33. The access terminal of claim 23, wherein the access terminal is operable to send delay-sensitive data during the first portion of the transmission time slot and send delay-tolerant data during the second portion of the transmission time slot.

34. The access terminal of claim 23, wherein the access terminal is operable to send code division multiplexed overhead channels in the first portion of the transmission time slot and send time division multiplexed data in the second portion of the transmission time slot.

35. The access network of claim 20, wherein the scheduler is operable to select and assign a different multiple access transmission mode for each subframe for at least one access terminal.

36. The access network of claim 20, wherein the scheduler is operable to select the selected multiple access transmission mode based on an application at an access terminal that produces data for reverse link transmission.

37. An access terminal operable to transmit data in each of a plurality of multiple access transmission modes, the access terminal comprising:
- means for receiving a signal indicating a selection of one of the plurality of multiple access transmission modes for one of a plurality of transmission time slots within a frame; and
- means for transmitting data in the selected one of the multiple access transmission mode during the transmission time slot;
- wherein said means for transmitting comprises:
- means for transmitting the data in a hybrid multiple access transmission mode in which data is code-division-multiplexed during a portion of a single transmission time slot, and data is either time-division-multiplexed or orthogonal-frequency-division-multiplexed during a remaining portion of the single transmission time slot,
- wherein the data comprises user data and overhead data,
- wherein transmission of the user data is prohibited during said portion of said single transmission time slot in which the data is code-division-multiplexed,
- wherein the data comprises user data to be transmitted through a traffic channel and overhead data to be transmitted through an overhead channel, and
- wherein the plurality of transmission modes comprises transmission modes that allow for a transmission of overhead data through the overhead channel only during a portion of a single transmission time slot in which code-division-multiplexing is implemented.

38. The access terminal of claim 37, wherein said means for transmitting comprises:
means for transmitting the data in a first multiple access transmission mode in which the data is code-division-multiplexed during the transmission time slot; and
means for transmitting the data in a second multiple access transmission mode in which the data is code-division-multiplexed during a first portion of the transmission time slot, and the data is either time-division-multiplexed or orthogonal-frequency-division-multiplexed during a second portion of the transmission time slot.

39. The access terminal of claim 38, further comprising:
means for sending delay-sensitive data during the first portion of the transmission time slot; and
means for sending delay-tolerant data during the second portion of the transmission time slot.

40. The access terminal of claim 38, further comprising:
means for sending code division multiplexed overhead channels in the first portion of the transmission time slot; and
means for sending time division multiplexed data in the second portion of the transmission time slot.

41. A non-transitory storage medium embodying executable instructions, the instructions comprising:
code for causing an access terminal (AT) to receive a signal indicating a selection of one of the plurality of multiple access transmission modes for one of a plurality of transmission time slots within a frame; and
code for causing the AT to transmit data in the selected one of the multiple access transmission mode during the transmission time slot;
wherein the plurality of multiple access transmission modes comprises a hybrid multiple access transmission mode in which data is code-division-multiplexed during a portion of a single transmission time slot, and data is either time-division-multiplexed or orthogonal-frequency-division-multiplexed during a remaining portion of the single transmission time slot, wherein the data comprises user data and overhead data, wherein transmission of the user data is prohibited during said portion of said single transmission time slot in which the data is code-division-multiplexed,
wherein the data comprises user data to be transmitted through a traffic channel and overhead data to be transmitted through an overhead channel, and
wherein the plurality of transmission modes comprises transmission modes that allow for a transmission of overhead data through the overhead channel only during a portion of a single transmission time slot in which code-division-multiplexing is implemented.

42. The storage medium of claim 41, further comprising:
code for causing the AT to transmit the data in a first multiple access transmission mode in which the data is code-division-multiplexed during the transmission time slot; and
code for causing the AT to transmit the data in a second multiple access transmission mode in which the data is code-division-multiplexed during a first portion of the transmission time slot, and the data is either time-division-multiplexed or orthogonal-frequency-division-multiplexed during a second portion of the transmission time slot.

43. The storage medium of claim 42, further comprising:
code for causing the AT to send delay-sensitive data during the first portion of the transmission time slot; and
code for causing the AT to send delay-tolerant data during the second portion of the transmission time slot.

44. The storage medium of claim 42, further comprising:
code for causing the AT to send code division multiplexed overhead channels in the first portion of the transmission time slot; and
code for causing the AT to send time division multiplexed data in the second portion of the transmission time slot.

45. An access network comprising:
a scheduler configured to select a multiple access transmission mode from a plurality of multiple access transmission modes, and to schedule a transmission of data from an access terminal to occur in one of a plurality of transmission time slots within a frame, and to use the selected multiple access transmission mode; and
a transmitter configured to transmit a signal indicating the selected multiple access transmission mode to the access terminal;
wherein the plurality of multiple access transmission modes comprises a hybrid multiple access transmission mode in which data is code-division-multiplexed during a portion of a single transmission time slot, and data is either time-division-multiplexed or orthogonal-frequency-division-multiplexed during a remaining portion of the single transmission time slot,
wherein the data comprises user data and overhead data,
wherein transmission of the user data is prohibited during said portion of said single transmission time slot in which the data is code-division-multiplexed,
wherein the data comprises user data to be transmitted through a traffic channel and overhead data to be transmitted through an overhead channel, and
wherein the plurality of transmission modes comprises transmission modes that allow for a transmission of overhead data through the overhead channel only during a portion of a single transmission time slot in which code-division-multiplexing is implemented.

46. The access network of claim 45, wherein the plurality of multiple access transmission modes comprise:
a first multiple access transmission mode in which the data is code-division-multiplexed during the transmission time slot; and
a second multiple access transmission mode in which the data is code-division-multiplexed during a first portion of the transmission time slot, and the data is either time-division-multiplexed or orthogonal-frequency-division-multiplexed during a second portion of the transmission time slot.

47. The access network of claim 45, wherein the scheduler is further configured to select the selected multiple access transmission mode based on transmission subframes.

48. The access network of claim 45, wherein the scheduler is further configured to select the selected multiple access transmission mode based on an application at the access terminal that produces the data for transmission.

49. A non-transitory storage medium embodying executable instructions, the instructions comprising:
code for causing an access network (AN) to select a multiple access transmission mode from a plurality of multiple access transmission modes;
code for causing the AN to schedule a transmission of data from an access terminal to occur in one of a plurality of transmission time slots within a frame and to use the selected multiple access transmission mode; and
code for causing the AN to transmit a signal indicating the selected multiple access transmission mode to the access terminal;

wherein the plurality of multiple access transmission modes comprises a hybrid multiple access transmission mode in which data is code-division-multiplexed during a portion of a single transmission time slot, and data is either time-division-multiplexed or orthogonal-frequency-division-multiplexed during a remaining portion of the single transmission time slot, wherein the data comprises user data and overhead data, and wherein transmission of the user data is prohibited during said portion of said single transmission time slot in which the data is code-division-multiplexed wherein the data comprises user data to be transmitted through a traffic channel and overhead data to be transmitted through an overhead channel, and wherein the plurality of transmission modes comprises transmission modes that allow for a transmission of overhead data through the overhead channel only during a portion of a single transmission time slot in which code-division-multiplexing is implemented.

50. The storage medium of claim 49, wherein the plurality of multiple access transmission modes comprise:
a first multiple access transmission mode in which the data is code-division-multiplexed during the transmission time slot; and
a second multiple access transmission mode in which a first portion of data is code-division-multiplexed during a first portion of the transmission time slot, and a second portion of data is either time-division-multiplexed or orthogonal-frequency-division-multiplexed during a second portion of the transmission time slot.

51. The storage medium of claim 49, further comprising code for causing the AN to select the selected multiple access transmission mode based on transmission subframes.

52. The storage medium of claim 49, further comprising code for causing the AN to select the selected multiple access transmission mode based on an application at the access terminal that produces the data for transmission.

53. The method of claim 26, wherein the plurality of multiple access transmission modes comprise:
a first transmission mode in which data is code-division-multiplexed during the transmission time slot;
a second transmission mode in which data is code-division-multiplexed during a first half of the transmission time slot, and data is either time-division-multiplexed or orthogonal-frequency-division-multiplexed during a second half of the transmission time slot; and
a third transmission mode in which data is code-division-multiplexed during a first quarter of the transmission time slot and data is either time-division-multiplexed or orthogonal-frequency-division-multiplexed during the remaining three quarters of the transmission time slot.

54. The method of claim 53, wherein scheduling of transmission of user data is prohibited during said first quarter of said transmission time slot in which the data is code-division-multiplexed.

55. The method of claim 26 further comprising updating the multiple access transmission mode after a number of transmission time slots.

56. The method of claim 55, wherein the transmission time slot comprises about 1.66 milliseconds, and the number comprises four.

57. The method of claim 26 further comprising transmitting a request to transmit data in the transmission time slot, and wherein scheduling the transmission is in response to the request to transmit data.

58. The method of claim 57 further comprising determining an opportunity level for the transmission time slot and transmitting the opportunity level.

59. The method of claim 57 further comprising sending an allocation request that asks for a resource to be allocated to a data flow within the access terminal during the transmission time slot.

60. The method of claim 59 further comprising allocating the resource to the data flow during the transmission time slot, in response to the allocation request.

61. The method of claim 60 further comprising transmitting an allocation message indicating the allocation of the resource.

62. The method of claim 59 further comprising sending the allocation request if at least two of the following are satisfied:
data is available for transmission, a predetermined amount of data has already been transmitted since a previous allocation request was sent, and a predetermined time interval has elapsed since the previous allocation request.

63. The communication system of claim 2, wherein the overhead data is transmitted using the first multiple access transmission mode and the user data is transmitted using the second multiple access transmission mode.

64. The method of claim 53 further comprising transmitting the overhead data using the first multiple access transmission mode; and transmitting the user data using the second multiple access transmission mode.

65. The communication system of claim 1, wherein transmission of the user data is allowed during said remaining portion of the single transmission time slot.

66. The communication system of claim 1, wherein transmission of a reverse rate indication channel is prohibited during said portion of said single transmission time slot in which the data is code-division multiplexed.

67. The communication system of claim 1, wherein a transmission power of the user data and a transmission power of the overhead data are controlled separately.

* * * * *